US011770003B2

(12) United States Patent
Kruse et al.

(10) Patent No.: US 11,770,003 B2
(45) Date of Patent: Sep. 26, 2023

(54) DEVICE, SYSTEM AND METHOD FOR CONTROLLING ELECTRICAL LOADS

(71) Applicant: Landis+Gyr AG, Cham (CH)

(72) Inventors: Lars Peter Kruse, Meilen (CH); Markus Fischer, Lucerne (CH)

(73) Assignee: Landis+Gyr AG, Cham (CH)

( * ) Notice: Subject to any disclaimer, the term of this patent is extended or adjusted under 35 U.S.C. 154(b) by 249 days.

(21) Appl. No.: 16/971,019

(22) PCT Filed: Feb. 14, 2019

(86) PCT No.: PCT/IB2019/051184
§ 371 (c)(1),
(2) Date: Aug. 19, 2020

(87) PCT Pub. No.: WO2019/159089
PCT Pub. Date: Aug. 22, 2019

(65) Prior Publication Data
US 2021/0083507 A1     Mar. 18, 2021

(30) Foreign Application Priority Data
Feb. 19, 2018   (CH) .................................... 00196/18

(51) Int. Cl.
*H02J 3/14*        (2006.01)
*H02J 13/00*       (2006.01)

(52) U.S. Cl.
CPC .......... *H02J 3/14* (2013.01); *H02J 13/00006* (2020.01); *H02J 2310/12* (2020.01)

(58) Field of Classification Search
CPC ..... H02J 13/00006; H02J 2310/12; H02J 3/14
See application file for complete search history.

(56) References Cited

U.S. PATENT DOCUMENTS 4,204,195 A    5/1980   Bogacki
4,241,237 A    12/1980  Bushman et al.
(Continued)

FOREIGN PATENT DOCUMENTS

EP     0821461 A1    1/1998
EP     0729213 B1    4/1998
(Continued)

OTHER PUBLICATIONS

Office Action, Japanese Patent Application No. 2020-543805, dated May 31, 2022, 12 pages.
(Continued)

*Primary Examiner* — Thomas C Lee
*Assistant Examiner* — Ameir Myers
(74) *Attorney, Agent, or Firm* — Kilpatrick Townsend & Stockton LLP

(57) ABSTRACT

Load control device, system and method for controlling a state of operation of at least one electrical load by receiving remote load control commands from at least one remote command centre with at least one receiving means of the load control device; and/or generating local load control commands with at least one local control unit of the load control device; and processing a stack of the remote load control commands and/or the local load control commands with at least one command processing unit of the load control device; and implementing an effective load control command containing at least one instruction for the effecting of the load control operations based on the stack for effecting load changing operations influencing the state of operation of the at least one electric load with at least one load interface unit of the load control device based on the at least one instruction.

18 Claims, 6 Drawing Sheets

| Priority | Remaining Time | Processing State | Value |
|---|---|---|---|
| 3 | 600 | InstructionProcessing 3 | 5 |
| 2 | 0 | Terminated | 5 |
| 1 | 30 | InstructionProcessing 1 | 2 |
| 0 | 1593 | StartDelay | 5 |

(56) References Cited

U.S. PATENT DOCUMENTS

| | | | |
|---|---|---|---|
| 4,348,668 | A | 9/1982 | Gurr et al. |
| 4,455,453 | A | 6/1984 | Parasekvakos et al. |
| 5,323,307 | A | 6/1994 | Wolf et al. |
| 5,905,616 | A | 5/1999 | Lyke |
| 6,115,676 | A | 9/2000 | Rector et al. |
| 6,172,616 | B1 | 1/2001 | Johnson et al. |
| 7,409,270 | B2 | 8/2008 | Schibli et al. |
| 7,940,901 | B2 | 5/2011 | Paraskevakos et al. |
| 9,007,186 | B1 | 4/2015 | Krummey et al. |
| 10,342,103 | B2 * | 7/2019 | Newman, Jr. .......... H05B 47/19 |
| 2003/0205938 | A1 | 11/2003 | Andarawis et al. |
| 2007/0143046 | A1 | 6/2007 | Budike |
| 2008/0157938 | A1 * | 7/2008 | Sutardja ................. G08C 19/00 368/10 |
| 2010/0070103 | A1 * | 3/2010 | Fleck ....................... H02J 3/14 700/295 |
| 2014/0188296 | A1 * | 7/2014 | Oh .................... H02J 13/00001 700/295 |
| 2016/0075244 | A1 | 3/2016 | Im |
| 2017/0149180 | A1 | 5/2017 | Siegler |

FOREIGN PATENT DOCUMENTS

| | | |
|---|---|---|
| EP | 0738033 B1 | 4/1998 |
| EP | 1811628 A1 | 7/2007 |
| EP | 2048758 A2 | 4/2009 |
| EP | 2362554 B1 | 4/2013 |
| EP | 2258034 B1 | 5/2017 |
| JP | 2003-077687 A | 3/2003 |
| JP | 2004-063213 A | 2/2004 |
| WO | 2010123239 A2 | 10/2010 |
| WO | 2012048787 A2 | 4/2012 |

OTHER PUBLICATIONS

Office Action, European Patent Application No. 19712019.9, dated Jun. 1, 2022, 8 pages.

International Search Report and Written Opinion, PCT Patent Application No. PCT/IB2019/051184, dated May 3, 2019, 12 pages.

International Preliminary Report on Patentability, PCT Patent Application No. PCT/IB2019/051184, dated Jun. 10, 2020, 61 pages.

Notice of Reasons for Refusal, Japanese Patent Application No. 2020-543805, dated Nov. 8, 2022, 8 pages.

* cited by examiner

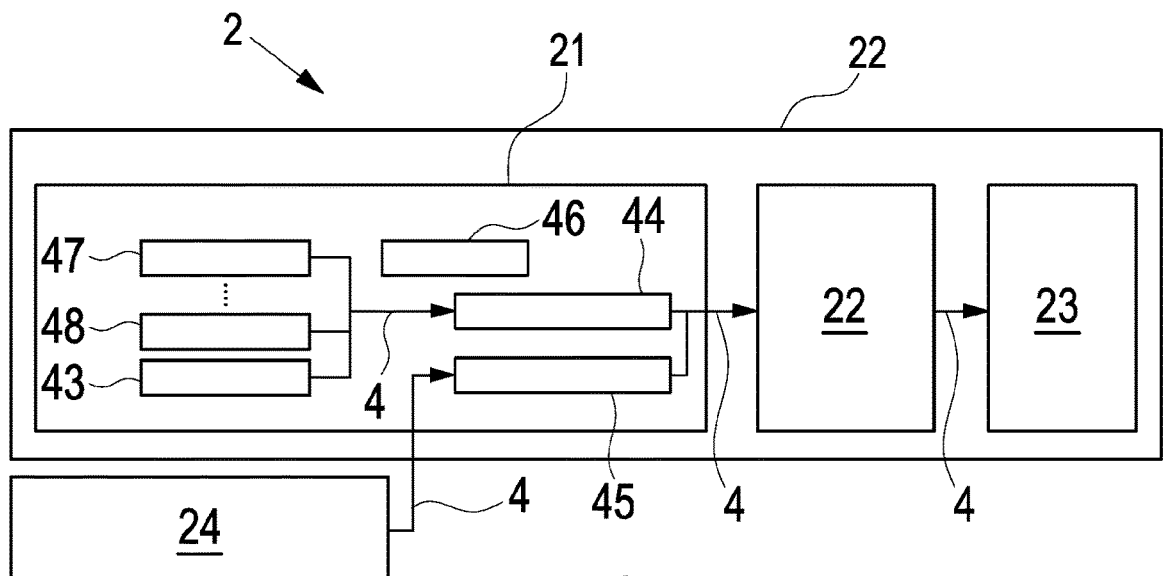
Fig. 6
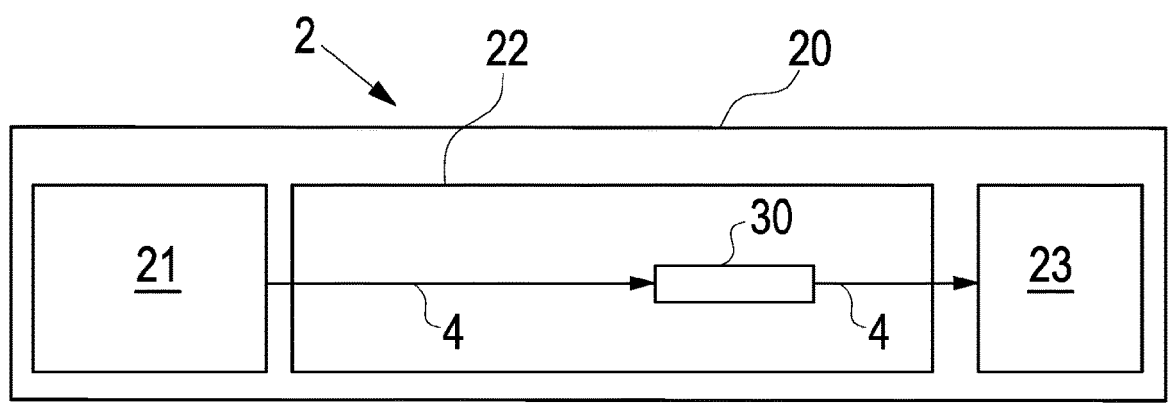
Fig. 7
| Priority | Remaining Time | Processing State | Value |
|---|---|---|---|
| 3 | 600 | InstructionProcessing 3 | 5 |
| 2 | 0 | Terminated | 5 |
| 1 | 30 | InstructionProcessing 1 | 2 |
| 0 | 1593 | StartDelay | 5 |
Fig. 8

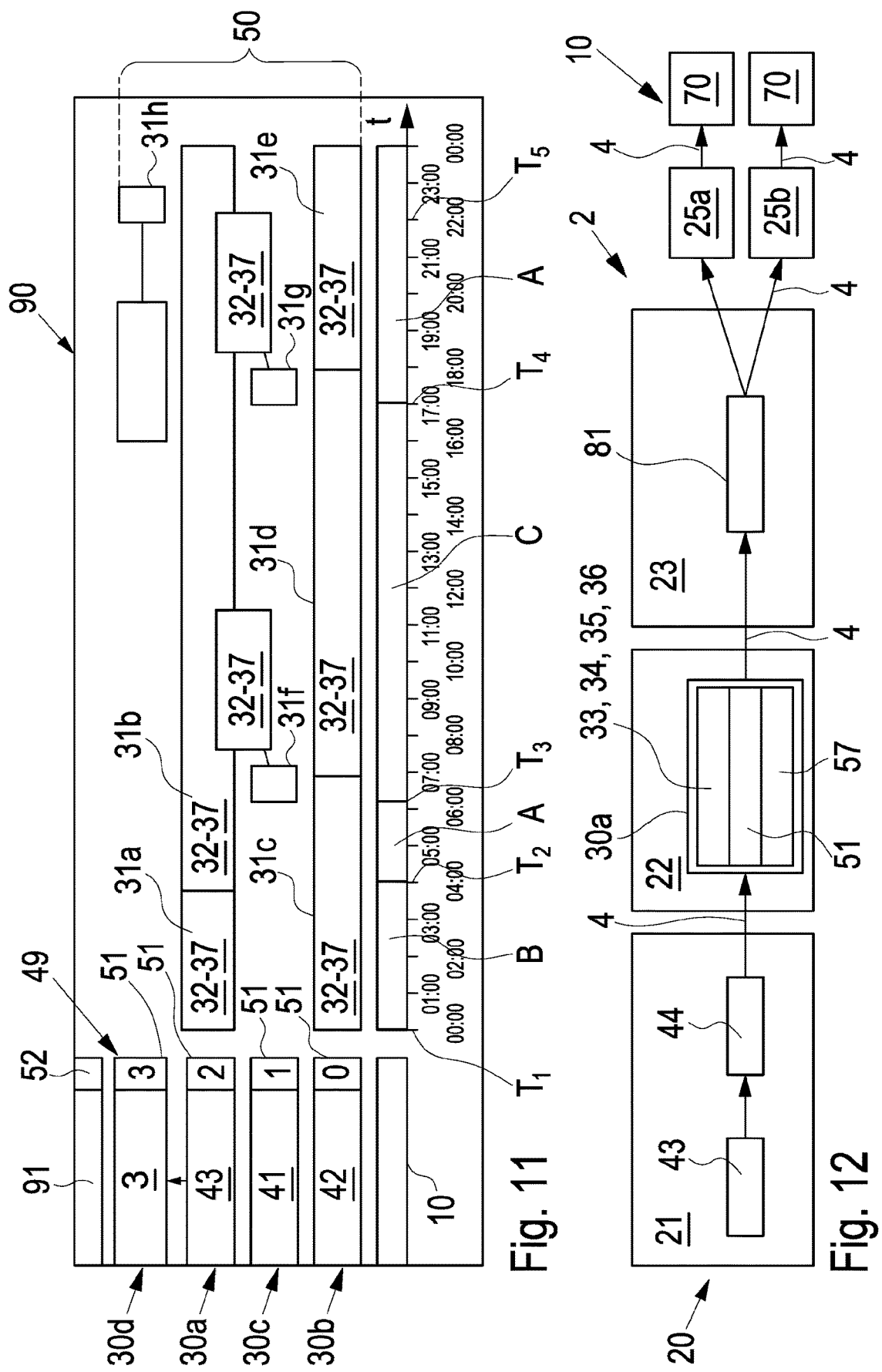

DEVICE, SYSTEM AND METHOD FOR CONTROLLING ELECTRICAL LOADS

The present invention relates to a load control device for controlling a state of operation of at least one electrical load. Further, the present invention relates to a load control system comprising at least one load control device. Furthermore, the present invention relates to a method for controlling a state of operation of at least one electrical load with a load control device. Moreover, the present invention relates to a computer program comprising instructions which, when the program is executed by a computer, cause the computer to carry out the steps of a method according to the present invention. Finally, the present invention relates to a computer-readable data carrier having stored thereon a computer program according to the present invention, as well as to a data carrier signal carrying the computer program according to the present invention.

TECHNOLOGICAL BACKGROUND

Devices, systems and methods for controlling electrical loads are known from the prior art. They are used for carrying out load management operations for balancing supply and generation of electricity in networks by controlling consumers and generators of electricity which are generally referred to herein as electrical loads or simply loads. A common form of load management uses ripple control, wherein receiver devices attached to loads are used for receiving high-frequency signals superimposing standard frequencies of main power signals for changing operational states of electrical loads, in particular by shutting them down and/or starting them up. For example, Ripple control networks and components thereof, such as, in particular, centrally arranged ripple control transmitters, are known from European patents EP 0 729 213 B1 and EP 0 738 033 B1 both granted to the applicant of the present invention.

Furthermore, EP 0 821 461 A1 on behalf of the applicant of the present invention describes a method involving circulation of a control message containing at least one command which acts upon an output relay of a control receiver, which in turn acts upon an associated group of the electrical loads to be controlled in order to perform a certain function. The message contains an additional command which causes an operation time to be stored which is a function of the current time of day. When the stored time is reached the function associated with the second command is performed providing the command time has not been changed to a later time in the meantime.

EP 1 811 628 A1 on behalf of the applicant of the present invention relates to a method involving recording temperature values through substations using a temperature sensor during a day, and detecting energy consuming values in a fixed time using an energy consuming counter. A predefined adjusting value in the range of 0 to 100 percentage of loading power of a load group is determined, and a loading time for the load group is determined for each load group depending on the temperature values. The adjusting value and the loading time are transmitted to a thermal load via a transmitter for supplying the value and the loading time associated with energy.

EP 2 258 034 B1 granted to the applicant of the present invention describes a system and method for determining whether audio-frequency telegrams have been correctly received at all points of a supply area. For this purpose, a ripple control system is proposed which additionally contains monitoring receivers distributed in the supply area and receiving emitted audio-frequency telegrams and buffering them. A monitoring central office can be connected to the monitoring receivers in order to receive the buffered telegrams and compare them to the telegrams emitted by a ripple control command device.

EP 2 362 554 B1 granted to the applicant of the present invention relates to a method that involves operating a remote control receiver with a filter set by a digital filter, a bit detector and a decoder unit. A switching control signal is supplied from the filter set to a frequency switching logic over the digital filter, the bit detector and the decoder unit for switching the remote control receiver to another filter set. The frequency switching logic is connected to the digital filter by a filter set unit that comprises the two filter sets. The digital filter is switched by the switching control signal to the latter filter set. A corresponding remote control receiver comprises a frequency switching controller.

U.S. Pat. No. 7,409,270 B2 granted to the applicant of the present invention describes a control apparatus for controlling an electrical load, having a housing, a plug mounted to the housing for connecting the control apparatus to the power outlet, a socket mounted to the housing for connecting the control apparatus to the electrical load, and a receiver unit mounted within the housing and coupled to the plug and the socket. In use, the receiver unit receives a control signal that is indicative of an impending congestion period. Upon receipt of the control signal, the receiver unit interrupts supply of power to the socket and, hence, switches the electrical load off.

WO 2012 048787 A2 on behalf of the applicant of the present invention describes a system having load switching devices including a time row unit and a profile unit with sub quantities of profile groups and profile sub groups of a load manager. All consumers of same consumer types are combined within each profile group. The consumers of the same consumer types with each profile group are distinguished into a number of other profile sub groups and activated or deactivated for time rows of the load switching device. The time rows are associated to corresponding profile sub groups.

U.S. Pat. No. 4,204,195 describes a meter terminal unit for use in automatic meter reading systems of the type including a control centre for transmitting commands to and receiving measurement data from the terminal unit via a distribution unit serving several terminal units. The terminal unit is selectively responsive to commands generated by the control centre to carry out load control operations, encoder meter reading and store operations, or transfer previously stored meter data from the terminal unit to the control centre in accordance with functions specified by the various commands.

U.S. Pat. Nos. 4,241,237 and 4,455,453 deal with a remote unit for a remote meter reading system. The remote unit initiates a telephone call to a central complex at a predetermined call-back time. In response to an acknowledgement signal indicative of a completed connection, the remote unit transmits indicia of its identity and collected data. The central complex responds with an instruction word, to control the next scheduled call-back time and operational mode of the remote unit. Error code, load management and demand metering provisions are disclosed.

U.S. Pat. No. 6,115,676 A describes a method and an apparatus for performing load profile and load control involving an electronic energy meter register which, in one aspect, is configured to perform load profile recording in a manner which eliminates a need for a backup battery. In other aspects, a routine of operating a meter register for providing a cost savings and/or productivity gain when a utility customer relocates and for ensuring that load control commands are effectively executed is described. The register, in one embodiment, is configured to be coupled to a meter including an eddy current disk and shaft which rotate in response to the rate of energy consumption by a load being metered. The register, in the one embodiment, includes a microprocessor, a non-volatile memory, and a disk sensing optics assembly.

U.S. Pat. No. 6,172,616 B1 relates to a wide area communications network communicating data from a plurality of network service modules through a plurality of remote cell nodes and intermediate data terminals to a central data terminal. The wide area communications network collects data generated by a plurality of physical devices such as gas, water or electricity meters, located within a geographical area. The remote cell nodes can be arranged to transmit control signals for operating equipment within the premises in which the network service module is located. This transmission capability can be used to control, for example, radio controlled switches within the premises of relatively high power equipment for load shedding at peak periods.

U.S. Pat. No. 7,940,901 B2 describes an integrated system-method and remote management devices for services and products that are mainly provided by public utility companies, which is primarily based on monitoring the consumption of the product. Both the organisation as well as the clients are provided with information (by means of specialised software) regarding the improved management of the products and services of the organisation and the more rational pricing. The consumers are given the chance to contribute to the saving of energy in a substantial manner, thus contributing to reduced environmental pollution. Other system features include the issuance and settlement of invoices, as well as other services such as tele-statistics, tele-marketing, tele-polling, etc.

US 2007 143046 A1 describes a multi-utility energy and facility automation control system that has control centre computers connected to various utility consuming systems and software that formats pertinent systems' energy data, stores, retrieves, diagnoses and acts in response to changes and includes a multi-utility master meter device and a plurality of sensors for utilities and other facility operational data. The system includes at least one dashboard screen as a control screen, and a plurality of interconnected gateways for selection of separate networks for various utility-facility related subscreens. The sensors monitor consumption of a plurality of different utilities and other pertinent data and, using the presentation of the facility information as processed by the computer and presented on the dashboard, exercise control of the facility to optimize performance and reduce the cost of purchased utilities and other facility operations.

Moreover, U.S. Pat. No. 5,323,307 A relates to an automation and energy management system including an automation panel box which may be positioned adjacent to a circuit breaker panel box. The automation panel box includes one or more circuit breaker control modules, one or more device control modules and a power module for providing power to the control modules. The circuit breaker control module provides signals to operate motorized circuit breakers, so as to turn on or off the power to a device being managed and the device control module provides signals to control individual appliances.

Each of the two control modules shown in U.S. Pat. No. 5,323,307 A is capable of controlling up to eight different circuit breakers or eight different individual devices and each includes a manual override button for each breaker or device controlled, which override button can be manually pressed by a person desiring to override the automation and energy management control. Each control module includes a counting circuit which sequentially enables one of several toggle circuits that sustains the state of each circuit breaker (or appliance switch). A facility computer generally communicates with the modules over a bus and issues commands to cause certain automatic functions of energy management.

U.S. Pat. No. 5,905,616 A describes a circuit breaker interconnect arrangement and a method for selective interruption of electrical circuits that includes at least one upstream circuit breaker having an upstream electronic trip unit and a microprocessor and a plurality of downstream circuit breakers connected to the upstream circuit breaker. The microprocessor transmits a trip command signal to the downstream electronic trip units at the occurrence of a predetermined load condition, such as an overload condition, through the upstream circuit. The downstream circuits can be designated as critical or sheddable. At the occurrence of a predetermined load condition through the upstream circuit, the microprocessor transmits the trip command signal to the sheddable downstream circuit breakers first according to a predetermined priority.

Finally, US 2003 205938 A1 describes a method and system for monitoring and controlling a power distribution system. This system includes a plurality of circuit breakers and a plurality of node electronic units. Each node electronic unit is mounted remotely from an associated circuit breaker that is electrically coupled with one of the node electronic units. The system also includes a first digital network, and a first central control unit. The first central control unit and the plurality of node electronic units are communicatively coupled to the first digital network.

The corresponding method laid down in US 2003 205938 A1 includes receiving digital signals from each node electronic unit at the central control unit, determining an operational state of the power distribution system from the digital signal, and transmitting digital signals to the plurality of node electronic units such that the circuit breakers are operable from the central control unit. A difference between the central control unit commands and actions and local commands and actions may indicate a problem. In one embodiment, a difference between the central control unit commands and actions and local commands and actions is arbitrated by a command resolution module using an arbitration algorithm to determine which set of commands and actions is used to determine actuation commands that are sent from node electronic units to circuit breakers. Commands from the central control unit should be implemented rather than the local commands and actions. Manual or local circuit breaker operability may be overridden by a lockout command initiated by the central control unit.

Devices, systems and methods for load management according to the prior art have the disadvantage that potential conflicts between remote and local commands for changing the operational state of an electrical load are resolved either automatically at a superordinated instance, i.e. higher level control facility, or manually at a local switch controller which is arranged at or near the load itself. Hence, known load management implementations operate one command at a time which forces the operator to plan switching actions in a one-dimensional time sequence This renders known devices, systems and methods for load management inflexible and complicates their administration.

DESCRIPTION OF THE INVENTION

An object of the present invention is to solve or at least mitigate disadvantages of Devices, systems and methods for load management according to the prior art. In particular, it is an object of the present invention to provide a flexible operability of known devices, systems and methods for load management, and to facilitate their administration.

This object is achieved by a device, system, method, computer program, computer-readable data carrier, and data carrier signal according to independent claims 1 and 14, respectively.

In particular, according to the present invention, the object is achieved by a load control device for controlling a state of operation of at least one electrical load, the load control device comprising

- at least one receiving means for receiving remote load control commands from at least one remote command centre; and/or
- at least one local control unit for generating local load control commands at the load control device;
- at least one load interface unit for effecting load changing operations influencing the state of operation of the at least one electric load, and
- at least one command processing unit connected to the receiving means and/or to the at least one load interface unit, and configured to process a stack of the remote load control commands and/or the local load control commands for generating based thereon an effective load control command containing an instruction for the effecting of the load control operations.

With a load control system, the problem is solved in that the system comprises at least one load control device according to an embodiment of the present invention.

In a method for controlling a state of operation of at least one electrical load with a load control device, the problem is solved in that the method comprises the steps of

- receiving remote load control commands from at least one remote command centre with at least one receiving means of the load control device; and/or
- generating local load control commands with at least one local control unit of the load control device; and
- processing a stack of the remote load control commands and/or the local load control commands with at least one command processing unit of the load control device; and
- implementing an effective load control command containing an instruction for the effecting of the load control operations based on the stack for
- effecting load changing operations influencing the state of operation of the at least one electric load with at least one load interface unit of the load control device based on the instruction.

A computer program according to the present invention comprises instructions which, when the program is executed by a computer, cause the computer to carry out the steps of a method according to the present invention.

A computer-readable data carrier according to the present invention has stored thereon a computer program according to the present invention.

A data carrier signal according to the present invention is carrying a computer program according to the present invention.

These solutions according to the present invention have the advantage over load management technologies according to the prior art that a functional split between at least one local control unit, command processing unit, and load interface unit increases a configuration flexibility and distributes complexity as well as responsibility over these three units. The separation of a command and an action taken, e.g. switching of an output contact, enables more complex switching configurations than possible with devices, systems and methods according to the prior art.

Moreover, based on stacking or accumulating the load control commands, the command processing unit is configured to handle a plurality of the load control commands simultaneously. The plurality of load control commands may refer to a plurality of remote load control commands and/or local load control commands. Thereby, the command processing unit offers an at least two-dimensional handling of load control commands. Handling a plurality of load control commands simultaneously further increases flexibility by the availability of instructions which may be implemented from one or more of the stacked load control commands. A special case may occur, when a load control command is implemented which does not contain any instruction. Such a load control command with empty or void instruction may be used e.g. to overwrite other load control commands to be eliminated.

By stacking the load control commands, the instructions therein may be handled simultaneously, i.e. structures may run in parallel to each other along a pre-defined timeline. Along the timeline, the instructions from different load control commands may overlap each other. In the stack of load control commands, the load control commands may be regarded as superimposing each other. Multiple instructions following each other along the timeline can be implemented in a single load control command.

Thus, the solutions to the present invention have a potential of addressing a wide range of distributed loads, i.e. energy consumers as well as resources by providing an ability to switch more than one output switch in a load, appliance and/or facility. Devices implementing the solutions can be used as multipurpose switching devices. The solutions can be implemented in metering devices which may then serve as intelligent switching devices taking advantage of an availability of local energy measurements to decide to reduce or increase power consumption, compensate for reactive power etc.

The solutions according to the present invention can be combined as desired and further improved by the further following embodiments that are advantageous on their own, in each case. Unless specified to the contrary, the embodiments can be readily combined with each other. A skilled person will easily understand that all apparatus features of devices and systems according to the present invention may as well be implemented as and/or constitute steps of a method according to the present invention and vice versa.

In a possible embodiment of a load control device according to present the invention, the command processing unit is configured to generate a command sequence of effective load control commands. The sequence of commands may be generated from the stacked load control commands. Generating the sequence may involve a sequential handling of the load control commands and/or the instructions therein. The sequence of load control commands and/or instructions can be output by the command processing unit to the load interface unit. In particular, within the command processing unit, a sequence of load control commands may be handled for generating a sequence of instructions and/or respective values to be output to the load interface unit in order to be applied to the at least one load. In sequencing the load control commands through the command processing unit, a load control device according to the present invention enables highly flexible as well as complex load management operations through both, remote and local load control commands.

In a possible embodiment of a load control device according to present the invention, the instruction includes an instruction value at least partly defining the state of operation of the load, and a time duration value defining a duration time of validity of the instruction value. The instruction can be embodied as an array of instructions, i.e. multiple instruction values may be included in a single load control command. For example, one instruction value may cause a load to start up, whereas another instruction value may cause a load to shut off. The time duration value may comprise a fixed duration and a random duration between implementation and ending of the instruction. Thereby, according to the present invention, definition of a state of operation of a load or changing the state of operation as well as the timing thereof can be achieved in an unprecedentedly precise and flexible, yet easy and reliable manner.

In a possible embodiment of a load control device according to present the invention, the at least one command processing unit is configured to administrate a priority table listing the load control commands sorted according to a respective command priority parameter. For example, a load control command with the highest priority parameter is the currently effective load control command. The load control command with the highest priority parameter can be arranged on top of the priority table for easily identifying the currently effective load control command. The instruction value of the at least one instruction of the currently effective load control command determines a process value being output from the command processing unit to the load interface unit which based thereon sets or changes a state of operation of the at least one load to be controlled. With the introduction of priorities, the command processing unit further facilitates a multi-dimensional handling of load control commands and in particular a multi-user access to each load to be controlled through the load control device.

The concept of prioritising commands according to the present invention may be used for extending the command management to at least a second dimension along the priorities. The command processor can handle multiple commands running in parallel separated by priority levels. This enables the coexistence of several users/interests within an appliance. With this at least two-dimensional approach, network critical situations can be managed easily by sending external commands e.g. with the highest possible priority that will temporary overrule a currently set behaviour of a load, appliance or facility, which will continue its previous behaviour after the overruling command has ended.

Thus, the operator sending commands overruling the standard behaviour does not need to know how about any stand-alone behaviours configured in a load control device according to the present invention which helps in further increasing flexibility as well as in facilitating load management operations. Authorisations for defining priority levels may increase in the direction from the load up to the utility provider. For example, highest priority levels may be given at a central energy generation stage at the utility provider. Medium priority levels may be given and intermediate stages between a central energy generation stage and the actual load to be controlled, i.e. along the respective power distribution stages in an electrical network for distributing electrical power. The lowest priority levels can be given via the local command unit at the load itself.

Such a scheme of hierarchies of entities with different authorisations for setting priority levels may of course be altered in case the load itself requires a higher priority than other stages. This may be the case, for example, if the load comprises an electricity generator. In particular renewable energy electricity generators, such as photovoltaic installations, wind power plants, or alike may require that they themselves are prioritised if they are generating a certain overhead of electricity due to respective environmental conditions, i.e. strong sunlight impact or winds, which cannot be locally used and needs to be fed into a grid for electrical power distribution, other electrical energy consumers, or alike.

In a possible embodiment of a load control device according to present the invention, an individual priority level is assigned to each of the command priority parameters in the priority table. Several load control commands can be handled simultaneously at different priority levels through the command processing unit. A newly received and verified load control command can override a load control command on the same priority level from the priority table. The priority level is determined based on the command priority parameter in the respective load control command. The command processing unit reads the priority parameter and inserts the incoming load control command into the priority table at the respective priority level associated with the priority parameter. Only a single load control command per priority level exists in the priority table. Thereby, conflicts between load control commands having the same priority level are easily resolved or do not even occur in the first place. Furthermore, certain users and/or operators of the load control device can be granted with respective permissions, such as limits and/or thresholds for priority parameters, for assigning the priority parameters to load control commands. This helps preventing the implementation of unauthorised and/or inappropriate load control commands and thus increases safety of the load control device against misuse.

In a possible embodiment of a load control device according to present the invention, each of the priority levels constitutes a state machine on its own. The load control commands can be handled independently of each other according to their respective priorities. This helps in further increasing flexibility and stability of load management solutions using a load control device according to the present invention.

In a possible embodiment of a load control device according to present the invention, processing states of the state machine comprise
   a start delay value representing a time span between start of a load control command and implementation of the instruction,
   an iteration value for defining a number of iterations of implementing the instruction, and
   a termination value for indicating termination of a load control command.

The start delay value may be implemented as a random delay between a start of the load control command and a first instruction and/or as a fixed delay between a start of the load control command and first the instruction. Such a start delay acts as a time window for delaying a subsequent instruction by implementation of the instruction value thereof. An iteration of instructions can be achieved by looping over instructions through the use of a respective instruction iteration value defining a respective number of iterations for the at least one instruction in a load control command. The instruction is then looped, i.e. repeated, according to the instruction iteration value. This helps in further facilitating the operation of a load control device according to the present invention in that the overall duration of any instruction can be determined by both, time values, such as delay and duration values, as well as iteration values for multiplying in particular the duration values. The termination value then helps in generating historical data, e.g. log files, which may be read out from the command processing unit in order to assess a time history of currently running and/or terminated load control commands.

In a possible embodiment of a load control device according to present the invention, the priority table is attributed with a persistence value defining a persistence of the at least one load control command contained in the priority table over a time of an electrical power outage. The persistence value is preferably attributed to the entire priority table. Through the persistence value, the load control commands and/or the priority table can be defined as being persistent e.g. over the time of a power outage or other fundamental events influencing a general functionality of loads and/or appliances connected to the load control device, such as failure states, maintenance work, etc. After such a fundamental event has passed, depending on the persistence value, the priority table is reinstalled and executed without any change in the "remaining" time parameters or alternatively, with desired adjustments of time parameters.

It may be desired to provide certain load control commands with different persistence values as other load control commands. For example, on the one hand, a load control command for a boiler which is supposed to be heated during an accumulated time of four hours over a day (i.e. "Boiler 4h") for providing a desired amount of warm water should be provided with a persistence value that ensures that after an interruption of the heating process due to a power outage, the heating process is reassumed in such a way, that the full four hours of heating are completed. Otherwise, energy supply of the boiler would be insufficient for providing the desired amount of warm water. On the other hand, load control commands for a street light application normally do not have to be provided with a persistence value assuring that they are powered over a pre-defined accumulated amount of time, because it would not make any sense to reassume an operation of the street lights during daytime when lighting is not required. Since the boiler and the streetlights are two different appliances, the respective load control commands can be easily provided with different persistence values by assigning the respective persistence values to each of the priority tables pertaining to the two different appliances.

Alternatively or additionally, it is theoretically possible that the persistence value maybe attributed to single load control commands or a group of load control commands, e.g. local load control commands and/or remote control commands. For example, persistence may be attributed to local load control commands, whereas remote load control commands are skipped in case of a power outage. Such a selective handling of load control commands helps in restoring a defined state of the load control device after a power outage when information regarding a state of load control commands running in the load control device may be not readily available to the remote command centre.

In a possible embodiment of a load control device according to present the invention, the at least one command processing unit is configured to address a load based on a characteristics-vector defining individual technical characteristics of the at least one electrical load. The characteristics-vector may be regarded as a container of group information that belongs together, such as e.g. an installation-type group, energy-contract group. The command processing unit may implement the characteristics-vector after previous evaluation of whether the characteristics-vector suits the loads addressable by the respective load interface unit. Upon successful evaluation of the characteristics-vector defining individual technical characteristics of the at least one load, like e.g. a name, type, purpose of the load, or alike, the command processing unit may determine the effective load control commands and derive therefrom respective instructions. Based on the instructions, the command processing unit can generate respective process values to be passed on to the load interface unit in order to then carry out pre-defined load control operations corresponding to the process value. Based on the instructions derived from the load control commands, the command processing unit generates a series of process values which one after the other determine a state of operation of the respective load. This helps in simplifying a communication with the respective loads.

In contrast to solutions for addressing switching commands according to prior art, which usually involve sending a respective command to a dedicated switch within a device in a point-to-point manner, a characteristics-vector concept according to the present invention offers a flexible command addressing that enables addressing of loads and/or appliances with multidimensional characteristics. An example command: "switch off all loads of type A1 or A2 connected to a feeder/area B with energy contract C1 or C2" will meet the criteria of an appliance with a characteristics-vector {A1, B, C2}. This further enhances flexibility and facilitates operation of a low management solution according to the present invention.

In a possible embodiment of a load control device according to present the invention, a command group vector comprises a plurality of the characteristics vectors. The Command group vectors may contain an array of characteristics vectors constituting the plurality of characteristics vectors. An appliance may be addressed if every command-group-vector has at least one element that is equal to the characteristics-vector of the appliance. Such a command group vector concept further facilitates addressing a plurality of appliances and respective loads with the help of a load control device according to the present invention.

In a possible embodiment of a load control device according to present the invention, the load control device comprises at least one appliance control arrangement configured to operate a plurality of loads associated to an appliance. The appliance control arrangement is associated to the respective appliance. Through the appliance control arrangement, all loads to be controlled pertaining to a respective appliance may be addressed with respective load control commands. The load control device may comprise a plurality of appliance control arrangements which in turn may address a plurality of a true appliances having a plurality of loads to be controlled. This helps in further facilitating to address certain appliances with the load control commands via a load control device according to the present invention.

In particular, an appliance to be controlled can be directly addressed by the respective appliance control arrangement which acts as an interface for an operator performing load management operations. The operator can access the loads within the appliance through the appliance control arrangement. The appliance appears to the operator as a single device with its respective loads. According to the prior art, rather physical output elements, i.e. specific physical output devices, such as a relay or alike, associated to and/or part of the appliance had to be addressed by the operator which rendered load control operations cumbersome. In contrast to that, a load control device according to the present invention enables to represent or model the appliance through the appliance control arrangement and thereby virtually control the loads within the appliance on an appliance level, but not on the level of the physical output elements. Hence, a load control device according to the present invention helps in facilitating load control operations as it enables to intuitively and economically control the appliances as addressing of their loads can be mapped through the respective appliance control arrangement upon installation and does not need to be performed by an operator during operation.

In a possible embodiment of a load control device according to present the invention, each appliance control arrangement is provided with at least one of the local control unit, the load interface unit, and the command processing unit. These and other units of a load control device according to the present invention may be grouped in or as an appliance control arrangement. Thereby, for every appliance to be addressed, at least one respective local control unit, load interface unit and/or command processing unit may be made available. This helps in further increasing flexibility of load management by use of a load control device according to the present invention.

In a possible embodiment of a load control device according to present the invention, the load control device comprises a common source module configured to define at least one event common to a plurality of the appliance control arrangements. The common source module may be connected to the local control unit of each appliance control arrangement. Events that are common to all appliances can be triggered by specific abilities of the common source module, such as push buttons or other physical inputs in the common source module.

Recognition of external events like power up or power down may also be implemented in the common source module. Internal events such as sunrise and sunset events from an astronomical calendar could depend only on geographical coordinates and may therefore also be regarded a source of events to a certain number of loads and/or appliances. Such external and internal events are referred to as common sources herein. When such common sources serve all loads and/or appliances, it may become mandatory that all configurations for the common sources are made during factory setup or at least at installation. Later changes may cause unintended side effects to the appliances.

A possible solution according to an embodiment of the present invention may involve that all these common sources triggers call specific script IDs within each at least one local control unit. The activated scripts could then send appropriate commands to the respective at least one command processing unit. Thereby, the events may be decoupled from a load and/or appliance because the respective local control unit is responsible for the behaviour of a trigger or instruction based on a respective common source. This helps in reliably and unambiguously solving conflicts between remote control commands and local control commands.

In a possible embodiment of a load control device according to present the invention, the load control device comprises a command dispatching module configured to dispatch received remote load control commands to the at least one appliance control arrangement. Remote load control commands sent to the load control device may be forwarded from the receiving means to the command dispatching module and/or may be received by the command dispatching module that distributes these commands further to all command processing units and/or appliances within the load control device. In other words, the command dispatching module may dispatch remote load control commands to several command processing units and/or appliance control arrangements. Remote load control commands containing a future execution time-stamp maybe stored and/or buffered in the command dispatching module and then distributed at the time of an execution time-stamp. This helps in increasing liability of load management solutions involving a load control device according to the present invention.

In a possible embodiment of a method according to the present invention, the method further comprises the step of providing a series of process values based on the stack, which process values one after the other determine the state of operation of the at least one load. Preferably, the process values are generated by the command processing unit, and are output by the command processing unit to the load interface unit. For example, each of the process values is based on the instruction value of the instruction of the load control command which is currently in effect. Thus, the series of process values is based on the sequence of load control commands derived from the stack of load control commands. A simple way of generating the process values is to use the respective instruction values as process values. Thus, an operator can easily define the instruction values for effecting load control operations, which instruction values are then passed on from the command processing unit to the load interface unit in order to carry out the desired load control operations.

BRIEF DESCRIPTION OF THE ACCOMPANYING DRAWINGS

The invention will be described hereinafter in more detail and in an exemplary manner using advantageous embodiments and with reference to the drawings. The described embodiments are only possible configurations in which, however, the individual features as described above can be provided independent of one another or can be omitted in the drawings:

FIG. 6 shows a schematic diagram illustrating an appliance control arrangement of a load control device according to an embodiment of the present invention;

FIG. 7 shows a schematic diagram illustrating a command processing unit of a load control device according to an embodiment of the present invention;

FIG. 8 shows an exemplary embodiment of a priority table for handling load control commands in a method according to the present invention;

FIG. 11 shows a schematic diagram illustrating an exemplary sequence of load control commands handled by a load control device according to an embodiment of the present invention;

FIG. 12 shows a schematic diagram illustrating an exemplary embodiment of a load control device according to an embodiment of the present invention configured for controlling a streetlight application;

WAYS OF EXECUTING THE INVENTION

Figure 1:
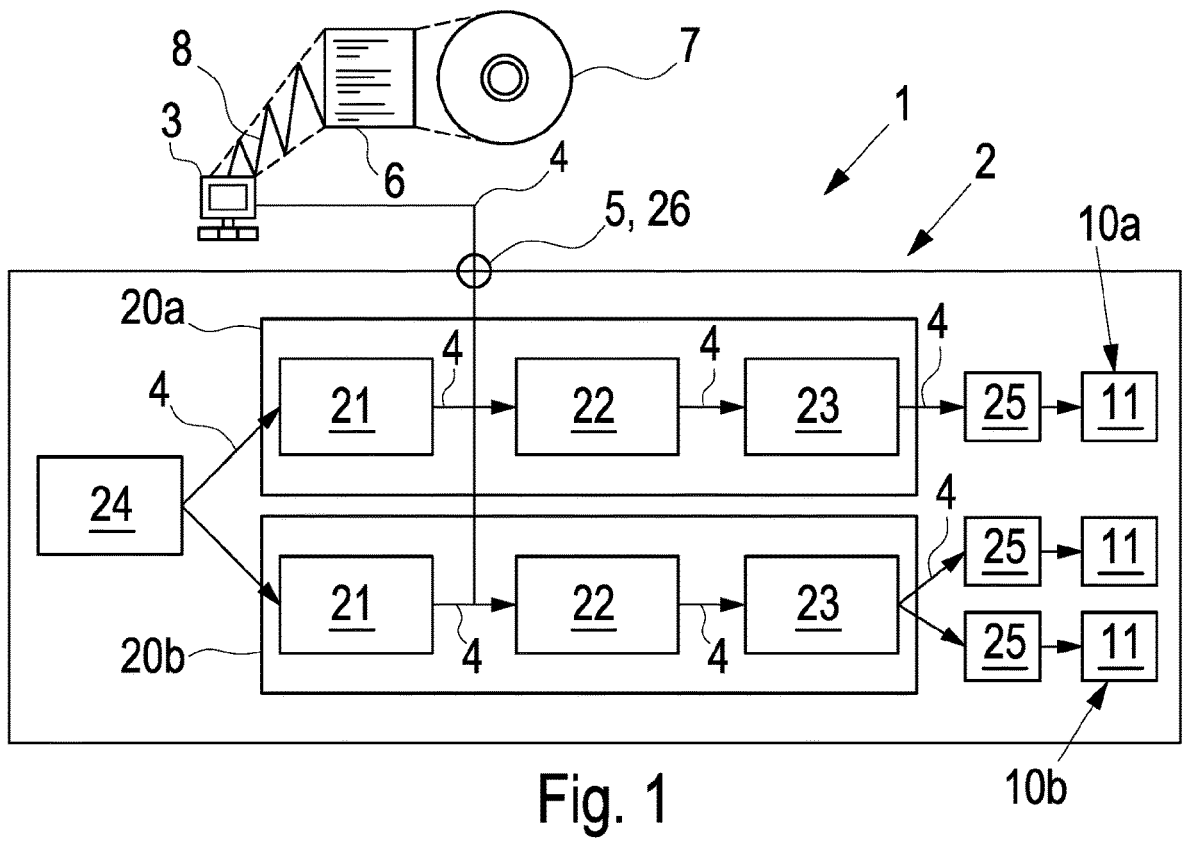
FIG. 1 shows a schematic diagram illustrating an exemplary schematic architectural overview of a load management system comprising a load control device according to an embodiment of the present invention.

FIG. 1 shows a schematic diagram illustrating an exemplary schematic architectural overview of a load management system 1 comprising a load control device 2 according to an embodiment of the present invention. The load control device 2 is connected to a remote command centre 3 via energy and/or information transmission lines 4 and receives energy and/or information from the remote command centre 3 through the respective receiving means 5. The load control system 1 is configured to control electrical appliances 10a, 10b each comprising at least one electrical load 11 by means of the load control device 2.

The load control device 2 comprises appliance control arrangements 20a, 20b for controlling the appliances 10a, 10b, respectively. Each of the appliance control arrangements 20a, 20b comprises a local control unit 21, a command processing unit 22, and a load interface unit 23. The local control unit 21 are connected to a common source module 24. The load interface units 23 are connected to output modules 25, for example digital outputs, such as relays, configured for switching the electrical loads 11. Furthermore, a command dispatching module 26 is provided at the receiving means 5 for dispatching information and/or energy received from the remote command centre 3 to the appliance control arrangements 20a, 20b. Within the load control device 2, the load control units 21, command processing unit 22, load interface unit 23, common source module 24, output modules 25 and/or command dispatching modules 26 may be connected to each other via the respective energy and/or information transmission lines 4 as well.

Furthermore, a computer program 6 is provided for controlling, the load control device 2 and/or the remote command centre 3 in line with a method according to the present invention. The computer program 6 is storable on a computer-readable data carrier 7 and transmittable in the form of a carrier signal 8 via the energy and/or information transmission lines 4. Accordingly, the computer program 6 or at least respective parts thereof may be carried out by the receiving means 5, the appliance control arrangements 20a, 20b, and the local control unit 21, the command processing unit 22, and the load interface unit 23, respectively in order to control the appliances 10a, 10b, and/or loads 11 in line with a method according to the present invention.

Figure 2:
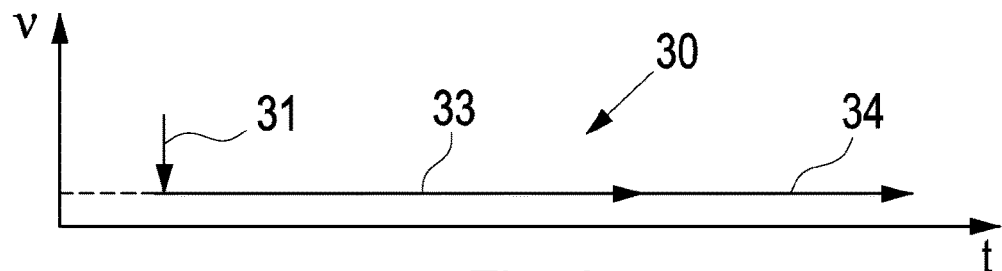
FIG. 2 shows a schematic diagram illustrating exemplary elements involved in an instruction of a load control command according to an embodiment of the present invention.

FIG. 2 shows a schematic diagram illustrating a load control command 30 comprising an instruction 31 according to an embodiment of the present invention. The load control command 30 can be send to the command processing unit 22 either from the remote command centre 3 for example via the command dispatching module 26, or from the local control module 21. Parameters of the load control command 30 may comprise but are not limited to an information regarding type or behaviour of the load 11 addressed, an origin of the load control command 30, and/or priority as well as duration of any instruction 31 contained in the load control command 30.

The instruction 31 contains at least one instruction value 32, a fixed duration value 33, and/or a random duration value 34. The fixed duration value 33 and/or the random duration value 34 represent a time information along the timeline t (abscissa) regarding how long the instruction value 32 measured along the respective dimension of a value v (ordinate), e.g. as an integer value, is valid. Consequently, an exemplary structure of the instruction 31 in Abstract Syntax Notation One (ASN.1), a common interface description language for defining data structures which may be serialised and de-serialised in a standard across multiple platforms, and thus may be applied in various different embodiments of control system 1 according to the present invention, may read as follows:

```
instructions ::= array of instruction
instruction ::= structure
{
    instruction_value:
    fix_duration:
    random_duration:
}
```

Figure 3:
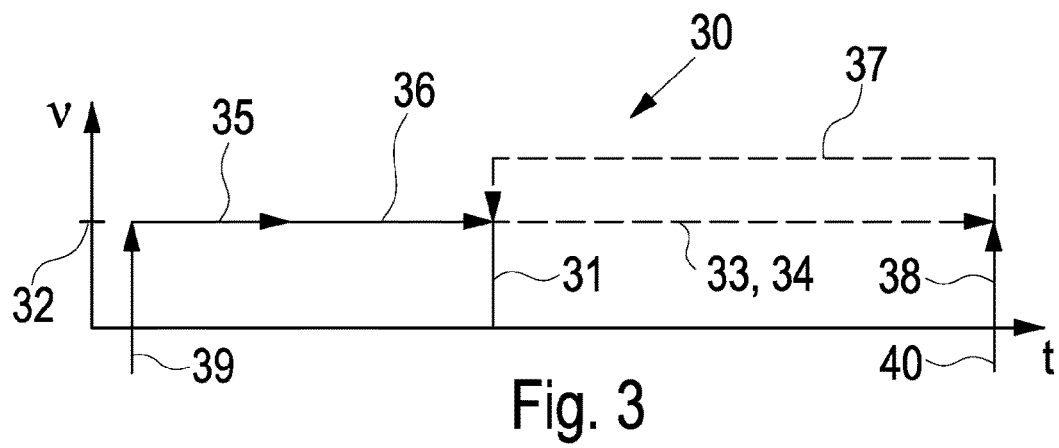
FIG. 3 shows a schematic diagram illustrating exemplary elements involved in the timing of load control command according to an embodiment of the present invention.

FIG. 3 shows a schematic diagram illustrating exemplary elements involved in the timing of load control command 30 according to an embodiment of the present invention. The load control command 30 comprises a fixed start delay value 35, a random start delay value 36, and/or an iteration value 37. A termination value 38 is generated and/or set by the command processing unit 22 after termination of a load control command 30. The fixed start delay value 35 and the random start delay value 36 define time windows used for delaying the subsequent instruction 31 after a command start time value 39. The fixed start delay value 35 defines first time-window after which either a second time window defined by the random start delay 36 begins, or if the random start developed a value is "0", the instruction 31 is being implemented. A second time window defined by the random start delay 36 is a fixed time window, within which a random point of time is chosen for the implementation of the instruction 31.

The command start time value 39 designates a time when the load control command 30 is activated in the load control device 2, in particular in at least one of the command processing units 22, after a positive validation of the load control command 30. The command start time value 39 is commonly determined by the arrival time of the respective load control command 30 at the command processing unit 22 and is usually depending on the time needed for validation and implementation of the load control command 30 which should last less that e.g. a second. After the start delay values 35, 36, the at least one instruction 31 contained in the load control command 30 comes effective for the sum of the duration values 33, 34 and possibly the iteration value 37 designating repetitions of the respective instruction 31. The time after the command start time value 39 and the sum of all start delay values 35, 36, duration values 33, 34, and/or iteration values 37 for all of the instructions 31 contained in the load control command 30 defines a command ending time value 40. The command ending time value 40 may be antedated if the respective load control command is overwritten by another load control command 30.

The iteration value 37 enables to loop over a one or more instructions 31. The duration of the instruction 31 as defined by the duration values 33, 34 is then repeated, i.e. looped, according to a certain number, e.g. an integer, defined by the iteration value 37. In other words, the iteration value 37 defines a number of repetitions of the instruction 31. Definitions of iteration values 37 according to embodiments of the present invention may read as follows in ASN.1 format:

instructions_iteration=0: Instructions will be processed endless.
instructions_iteration=1: Instructions will be processed once.
instructions_iteration>1: Instructions will be processed as many times as denominated.

In order to stop and/or a board and endless iteration, the respective load control command 30 can be overwritten by another load control command 30 and will thus be terminated.

Figure 4:
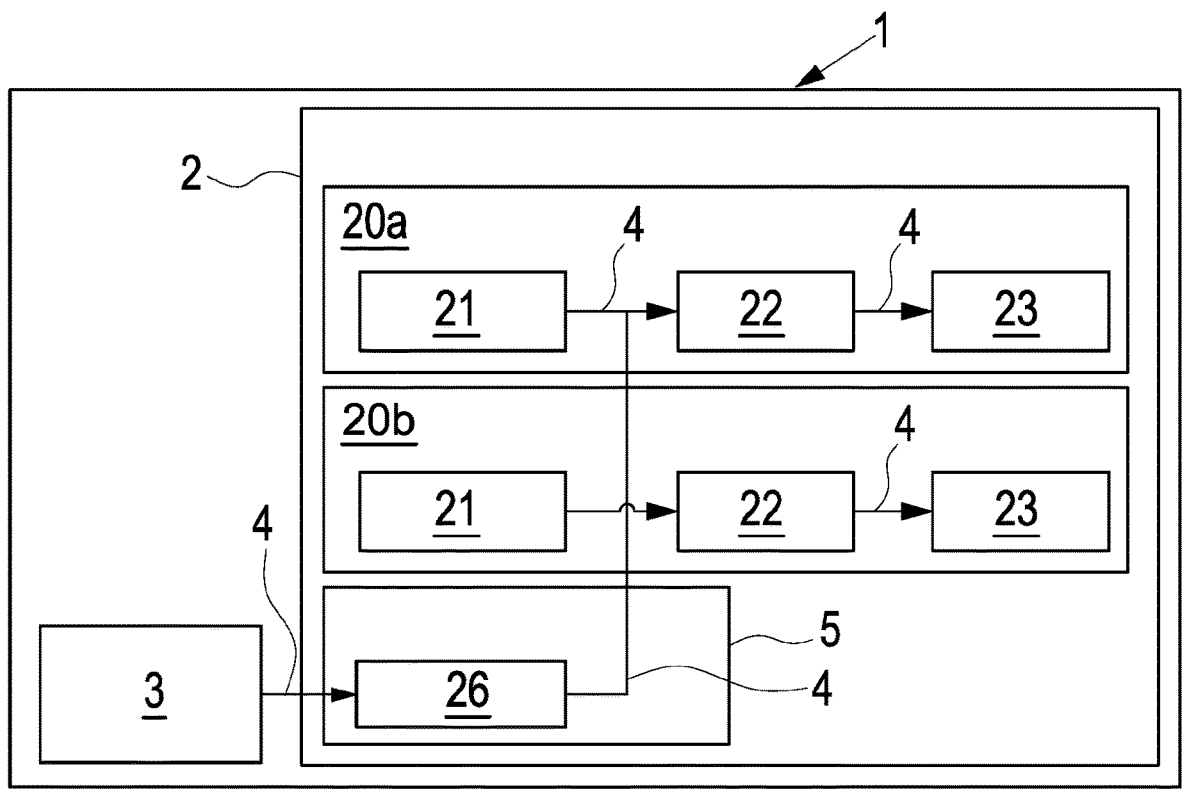
FIG. 4 shows a schematic diagram illustrating a command dispatching module of a load control device according to an embodiment of the present invention.

FIG. 4 shows a schematic diagram illustrating the command dispatching module 26 of the load control device 2. The command dispatching module 26 can be part of or at least connected to the receiving means 5, so that the command dispatching module 26 may act as a single entry point for all remote load control commands 30 sent as point-to-point or broadcast signal from the remote command centre 3 to the load control device 2. The command dispatching module 26 distributes the remote load control commands 30 to all or selected appliance control arrangements 20 within the load control device 2. The addressing of a specific appliance control arrangement 20 in the device is done by applying group information pertaining to the respective appliance 10 with the load control command 30. Preferably, there is only a single command dispatching module 26 per load control device 2 which acts as an interface to the remote command centre 3 for remote load control commands 30 and any other external commands (see also FIG. 10).

In addition to the distribution functionality, the command dispatching module 26 may also comprise a buffer or any other kind of storage means configured for buffering or storing load control commands 30 for their delayed distribution. The delay in distribution can then be defined for example by respective date and time information coming with the remote load control command 30. Command. Buffering or storing load control commands 30 is required if the respective energy and/or information transmission line providing a communication channel is known to be slow or not reliable and can also be used if a load control command 30 is destined for being processed in several load control devices 2 at the same time, i.e. simultaneously. Preferably, the storage of remote load control commands 30 is persistent.

In order to be able to be properly handled by the command dispatching module 26, the remote load control command 30 can comprise date and time information used to delay the distribution of the remote load control command 30, and a command ID for buffer and/or storage management which can take the following form in ASN.1 format:

```
external_command ::= structure
{
command_id: double-long-unsigned; number to identify the load
control command 30
date_time: octet-string (12); Execution date and time
command: structure; load control command 30
}
```

The content of the date and time structure can be defined in accordance with the DLMS Blue Book Version 12.1 for example. DLMS or Device Language Message Specification is a suite of standards developed and maintained by the DLMS User Association and has been adopted by the IEC TC13 WG14 into an IEC 62056 series of standards. IEC 62056 by the International Electrotechnical Commission is a set of standards for data exchange within Advanced Metering Systems (AMR), in particular between electricity meters. The IEC 62056 standards are the International Standard versions of the DLMS/COSEM specification.

The processing of remote load control commands 30 can depend on the content of this parameter. The following rules may be applied for a load control command 30 which:
is stored when the timestamp (date_time) is in the future,
with a timestamp in the past is not dispatched,
with an empty timestamp is dispatched immediately,
in the store is dispatched when the timestamp is equal to the load control device 2 time, and/or
in the store that has a timestamp in the past (e.g. due to power outage, time change, etc.) will be removed from the store without dispatching.

A command identifier parameter can be used to identify the load control command by a given number to manage the storage of remote load control commands 30. A command ID should be unique in the load control system 1 during storing time. The following rules can be applied to the command ID: A remote load control command 30 with an identical command ID to a stored remote load control command 30 will:
overwrite the stored load control command 30 if the time stamp is greater than now; and/or
delete a stored load control command 30 if the timestamp is less or equal than now or empty.

In difference to buffered, stored, local and/or effective load control commands 30, remote load control commands can have a time and date information as well as a command ID. Remote load control commands 30 can be stored by the command dispatching module 26 and/or command processing unit 22 for delayed execution based on the time and date information. Local load control commands 30 from the local control unit 21 can be sent directly to the dedicated command processing unit and do not have to pass the command dispatching module 26. Local load control commands 30 from the local load control unit can have empty group information because they may be regarded as always being correctly addressed (e.g. appliance control arrangement 20 internal).

Figure 5:
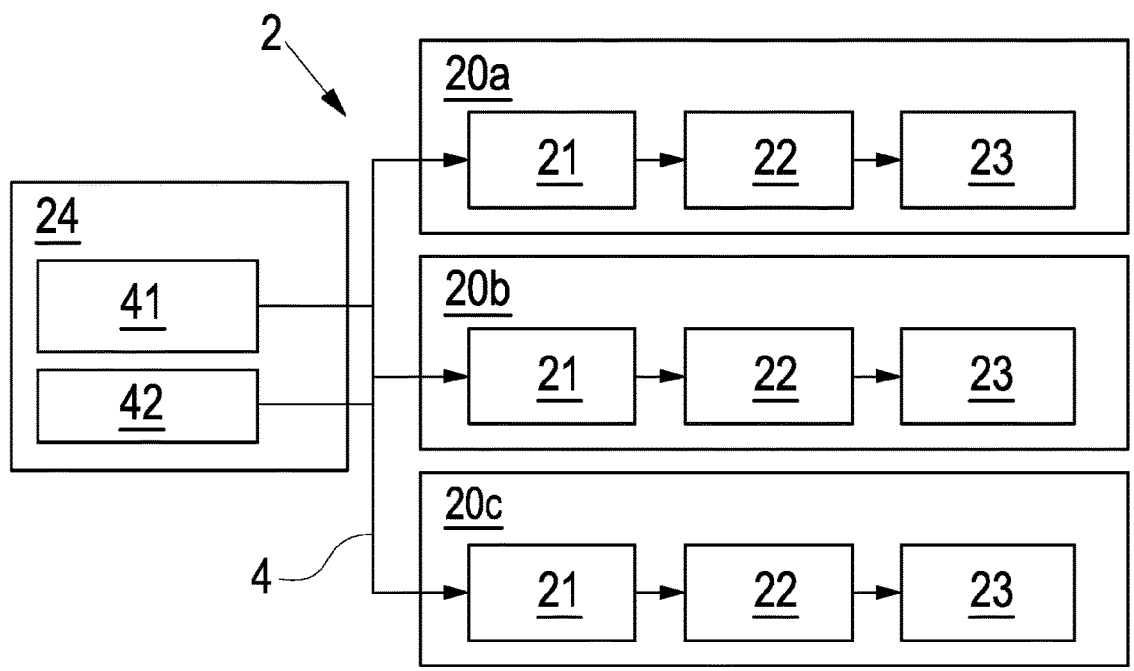
FIG. 5 shows a schematic diagram illustrating a common source module of a load control device according to an embodiment of the present invention.

FIG. 5 shows a schematic diagram illustrating the common source module 24 of the load control device 2 according to an embodiment of the present invention. Events that are common to all appliance control arrangements 20*a-d* can be triggered by specific local triggering means 41 providing the desired abilities and usability, such as e.g. sensors, push buttons or other physical inputs at or related to the load control device 2. External events like power up or power down can also be included as local triggering means 41. Internal events, such as sunrise and sunset events, can be generated with the help of a calendar means 42, e.g. in the form of an astronomical calendar, and may be regarded as depends only on geographical coordinates and are therefore also a source of events to all appliance control arrangements 20a-c. All these events are referred to herein as common information sources.

When the common information sources serve all appliance control arrangements 20a-c, it is preferred that all configurations for the common sources are made during factory setup or at least at installation of the load control device 2. Later changes may cause unintended side effects at the appliance control arrangements 20a-c. A possible solution can be that all common information source triggers call specific script IDs within each appliance control arrangements 20a-c. The activated scripts will then send the appropriate commands to the command processing unit. With this technique, the events may be decoupled from the appliance control arrangements 20a-c, because the local control unit 21 can be responsible for the behaviour of a local triggering means 41 and/or calendar means 42.

In such an exemplary embodiment of a load control device 2 according to an embodiment of the present invention, configuration of the common source module 24 can be made during manufacturing and/or by default in firmware of the load control device 2 since in general, they do not need to be accessed and/or altered frequently. Configurations carried out locally upon installation of the load control device 2 may involve e.g. a localisation of the load control device in order to adjust parameters in the calendar means accordingly. Dedicated script IDs can be specified to configure the event behaviour. The behaviour is then configured in the respective load control units 21 of all appliance control arrangements 20a-c. These dedicated script IDs can be specific to the load control system 1.

FIG. 6 shows a schematic diagram illustrating an appliance control arrangement 20 of the load control device 2, in particular the local control unit 21 thereof. The local control unit 21 contains elements that are used to operate the appliance 10 in stand-alone mode which may be required for appliances 10 like e.g. heat-pumps or boilers that have to be switched on during night time for temperature regulation based on local parameters without any remote load control command 30 from the remote command centre 3 at hand. Each appliance 10 can be provided with its own, designated and/or proprietary local control unit 24 which can be configured as required for issuing the necessary local load control demands 30 in order to control appliances 10 and loads 11 in a desired way (see also FIG. 10).

The local control unit 21 interfaces to the command processing unit 22. The local control unit 24 sends local load control commands 30 which may have an identical structure as the remote load control commands 30 received from or via the command dispatching module 26. Within the local control unit 24 e.g. every known or new DLMS class can be used to configure a specific behaviour. To clearly isolate the appliances 10 from each other, it is mandatory that DLMS objects used in a local control unit 24 do not interference with other appliances 10 (see also FIG. 10).

As an example, an activity calendar element 43 for defining, designating and/or recording a time of use (TOU) of the appliance 10 may be used to configure static behaviour such as daily and seasonal switching operations. Therefore, every appliance control arrangement 20 in the load control device 2 can be provided with its own dedicated activity calendar element 43. DLMS classes used to configure standalone behaviour in the appliance 10 should be instanced in accordance with the respective number of output modules 25 at hand, e.g. four instances should be provided for an appliance control arrangement 20 controlling an appliance 10 with four loads 11 to be switched by four relays constituting the respective output modules 25.

A local script table element 44 (e.g. defined in accordance with DLMS blue book class_id=9) acts as interface to the command processing unit 22. In the script table element 44, a script ID can be connected to data representing a load control command 30. This load control command 30 configures a behaviour which will be processed in the command processing unit 22. A common script table element 45 for defining, designating and/or recording common source events can be used in the local control unit 21 specifically for being accessed by the common source module 24. Taking in account dedicated script IDs which may be generated by the common source module 24, the common script table element 45 helps to avoid interferences between the dedicated script IDs from the common source module 24 and any script IDs used for the local control unit 21. To disable a common source event, the corresponding script ID can be deleted from the common script table element 45. In view of that existing common source module 24 objects may commonly trigger an event and do not send script IDs, the common source script table element 45 should be implemented specifically for receiving such events.

In load management operations, special behaviours may be required for events during a time of installation of an appliance 10. For example, during installation, a behaviour trigged by a local triggering means 41, such as e.g. a push button behaviour, should be configured to test the managed appliance 10 and/or load 11. After the installation, an end user behaviour should be activated by the respective local triggering means 41. Furthermore, for a first power up process after or during installation, a specific power up behaviour could be required to ramp up or boost energy supply to the appliance 10, e.g. as preferred for boiler heating. After installation, the behaviour of a power up is then adapted to normal and/or standard needs.

To implement such specific behaviours, the common script table element 45 for common sources events implements a connection to a specific hardware circumstance. For example, a physical event, such as an open terminal cover can be detected by respective means. If such a physical event occurs, the common source module 24 and/or the local control unit 21 should activate respective additional script IDs, like in case of an open terminal cover could be "HW secured" script IDs which are then deactivated by another physical event terminating the specific hardware circumstance, like closing the terminal cover in the present example case. Due to that any configuration of the behaviour of the appliance 10 can be performed by means of the local control unit 21, a local load control command 30 setting the operational state of the appliance 10 to e.g. a "HW secured" can easily be issued with a priority to override any other load control command 30 initiated by other "normal" events through the remote command centre 3 and/or the common source module 24.

A local control type element 46, e.g. in the form of a simple octet string stored in a data object (see DLMS blue book class_id=1), may be used for identifying a type of the local load control unit 21 which defines at least one standalone behaviour of the appliance 10 and/or load 11. Operators and/or end users of the appliance 10 and/or load 11 may create a limited number of fixed local controls, such as the local triggering means 41 and/or the calendar means 42 for specific appliances 10 and/or loads 11. By means of the local control type element 46, identifying respective fixed local controls can be simpler than as through reading out a configuration of the local control unit 21 via the energy and/or information transmission lines 4 from the remote command centre 3.

For example, if the appliance 10 is embodied as a boiler which needs 4 hours to heat up, possible advantageous local control behaviours may be defined as:

Boiler 4h Shading 20:00
Boiler 4h Shading 22:00
Boiler 4h Shading 24:00
Boiler 4h Shading 02:00

An auxiliary control element 47, such as other DLMS objects, including all known or new DLMS classes, may be used to configure an appliance 10 and/or load 11 as long as the following requirements are fulfilled:

The auxiliary control element 47, e.g. embodied as a DLMS object or a chain of DLMS objects, can trigger a script ID in the local script table element, and/or
The auxiliary control element 47, e.g. embodied as a DLMS object, used for the local control unit 21, is instanced as many times as the number of appliances 10 present.

Furthermore, a single action schedule element 48 may be used for scheduling specific single actions to be carried out through the local control unit 21, for example as derived from and/or in conjunction with the auxiliary control element 47. Therefore, the single action schedule element 48 may be defined and operated in a standardised manner like all other elements 43, 44, 45, 46, 47. It may be provided that all DLMS objects may connect with their respective long names directly to a specific element to be addressed, i.e. the appliance control arrangement 20 and the respective appliance 10 and/or load 11 (see also FIG. 10). Thereby, a standard use over generations of load control devices 2 according to the present invention can be implemented with an as high as possible interoperability between each other.

However, in view of the nature of the DLMS objects does not allow to force a direct connection of the local control 21 unit to the local control type element 46, several DLMS objects can be used to create a stand-alone behaviour of an appliance 10 and/or load 11 without any predefinition of a process to set or change local controls. Switching from one to another local control unit 21 may be cumbersome since it is at least currently not directly supported by DLMS objects themselves. Hence, it is advantageous to configure a stand-alone behaviour of an appliance 10 and/or load 11 in an application layer in the remote command centre 3.

FIG. 7 shows a schematic diagram illustrating the command processing unit 22. The command processing unit 22 connects the local control unit 21 to the load interface unit 23 and provides functions comprising receiving and interpreting load control commands 30, filtering of load control commands 30 with group and characteristics information regarding appliances 10 and/or loads 20, sorting load control commands 30 according to their priority, managing instruction values 32, duration values 33, 34, and/or delay values 35, 36 of active load control commands 30, and/or managing a persistence of load control commands 30. Preferably, for every appliance control arrangement, at least one command processing unit 22 is provided.

The load control commands 30 can originate from the from local control unit 21 and/or remote command centre 3. Load control commands 30 originating at the remote command centre 3 may be dispatched to respective designated appliance control arrangements 20 by means of the command dispatching module 26. An interface of the command processing unit 21 may be identical for incoming load control commands 30 from the local control unit 21 and the command dispatching module 26 and/or remote command centre 3, respectively.

FIG. 8 shows an exemplary embodiment of a priority table 49 for administering load control commands 30 by the command processing unit 22. In the illustrated exemplary snapshot of the priority table 49, a vertical and/or horizontal a stack 50 of the load commands 30 is formed. The command processing unit 22 administers the priority table 49, and may use a command priority parameter 51a-d defining an importance or ranking of the load control commands 30 determining their activation as they form the stack 50 handled by the command processing unit 22. Within the illustrated exemplary embodiment of the stack 50, the load control commands 30 are arranged above each other on respective priority levels 52a-d. For example, the active load control command 30 with the highest command priority parameter 51 on top of the stack 50 will write and/or pass on its instruction value 32 to designate a status of the load control command 30 that is further processed in the load interface unit 23.

Each priority level 52, e.g. in a vertical arrangement of the stack 50, each line within the priority table 49, constitutes a state machine 53 on its own. The possible processing states of an active load control command 30 are expressed by the duration values 33, 34, and/or start delay values 35, 36 as laid down with respect to FIGS. 2 and 3 above, which can also be expressed with respective variables "StartDelay", "InstructionProcessing_(1..n)" and "Terminated". A remaining time value 54 of a processing state variable 55a-d of each of the state machines 53 is decremented per a predefined time interval (e.g. every second).

The processing states variables 55 change automatically, when the remaining time value 54 of the respective instruction 31 reaches zero. In other words, the processing state variables 55 represent corresponding instructions 31 or are being derived therefrom. The instruction values 32 of the state machines 53 are set according to the respective active or processed instruction 31. A state change from instruction 31 No. x to instruction 31 no. (x+1) will bring the new instruction value 32 of instruction 31 No. (x+1) into effect, e.g. by writing that instruction value into a value field of the priority table 49. When the last instruction 31 from the respective load control command 30 has lapsed, the corresponding remaining time value 54 has reached zero and the processing state variable 55 is set to "Terminated" or alike for expressing termination of all the instructions 31 of the load control command 30.

Several of the load control commands 30 can run simultaneously at the different priority levels 52 in the priority table 49 (see FIG. 8). However, a newly received and verified, i.e. fresh, load control command 30 will preferably overwrite a running load control command 30 on the same priority level 52 in the priority table 49. Consequently, only one load control command 30 per priority level 52 is listed in the priority table 49. During the processing state 55d ("StartDelay"), the value v set for the respective state machine 53d can be equal to the actual value v of the attribute "process_value" being represented by the instruction value 32 of the currently effective load control command 30.

Figure 9:
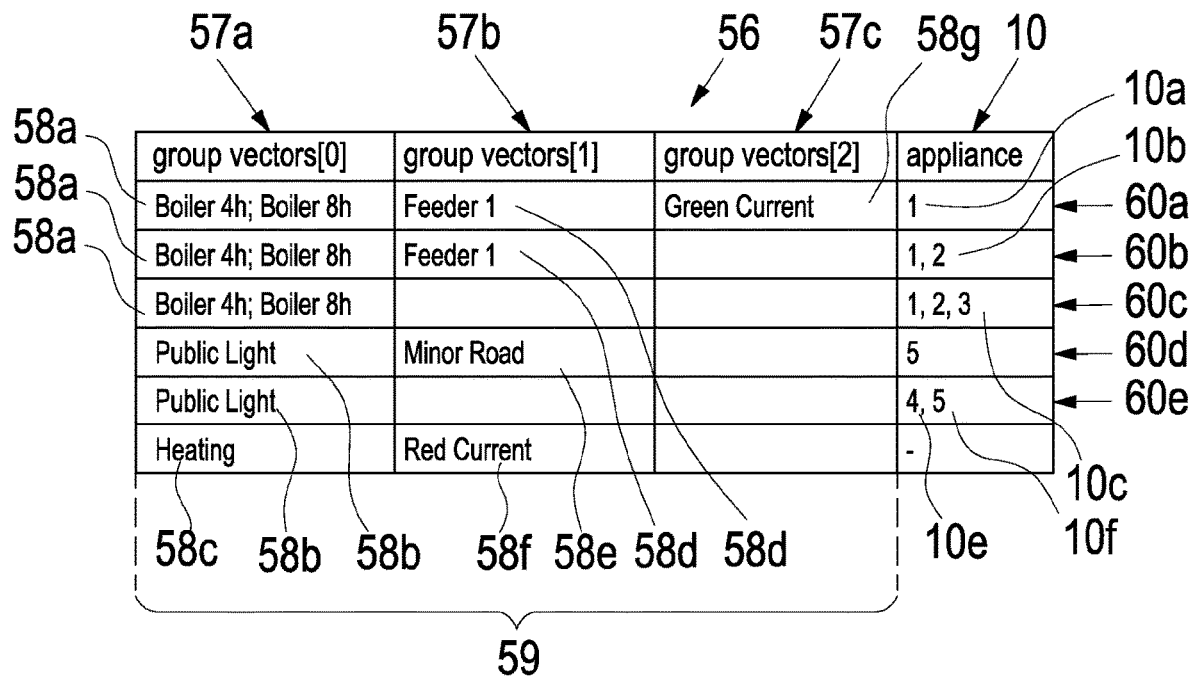
FIG. 9 shows an exemplary embodiment of a vector table listing group vectors for addressing appliances and/or loads in a method according to the present invention.

FIG. 9 shows an exemplary embodiment of a vector table 56 listing group vectors 57a-c which may be included in the load control commands 30 for addressing appliances 10 and/or loads by means of the command processing unit 21. The load control commands 30 comprise vector information 58a-d which can be evaluated and/or verified by means of a characteristics-vector 59*a-d* stored in the command processing unit 22. The group-vectors 57*a-c* are used to address specific appliances 10 and/or loads 11 and can form vector arrays 59 each comprising a row of the group vectors 57*a-c*. Preferably, in the load control system 1 appliances 10 and/or loads 11 are addressed by means of a respective characteristics-vector 60*a-e* associated to the appliances 10 and/or loads 11, and not through specific DLMS objects. Group vectors 57*a-c* enable to broadcast load control commands 30 to be sent to all designated appliance control arrangements 20.

An exemplary structure of the group vectors 57*a-c* in ASN.1 format may take the following form with respective variable definitions:

command_group_vectors::=array group_vector
group_vector::=array long-unsigned

The variable "command_group_vectors" representing the vector array 59 is preferably embodied as an array of the variable "group_vector" representing the a respective group vector 57. The variable "group_vector" preferably contains a list of identifiers that reflects the variety of appliances 10, loads 11 and/or respective load control arrangements 20 to be addressed in the load control device 2 by means of a respective individual characteristics vector 60 of each of the appliances 10, loads 11 and/or respective load control arrangements 20, containing corresponding individual identifiers, denominators, or alike.

Such a structure enables to send address information in the following exemplary vector form:

[array of load types] [array of locations] [array of contracts] [array of . . . ]

For evaluating and/or verifying the group vectors 57 by means of characteristics vectors 60, appliances 10, loads 11 and/or respective load control arrangements 20 are preferably addressed if every group vector 57 contains at least one element that is equal to the respective characteristics vector 60, which may be expressed by the following exemplary logic:

[element_1a OR Element_2a OR . . . ] AND [element_1b OR Element_2b OR . . . ] AND [ . . . ] AND [ . . . ] . . .

Special cases in evaluating the group vectors 57 by means of the characteristics vector 60 may occur if the group vector 57 is empty. The evaluation of the empty group-vector 57 can always be true, in particular for load control commands 30 generated for and/or by means of the local control unit 21. An empty characteristics vector 60 can only be addressed by an empty group vector 57 which in general should be the case for a load control command 30 sent by the local control unit 21.

The characteristics vectors 60 are addressed by means of the group vectors 57 as illustrated in FIG. 9:

Loads group-vector 57*a*, including e.g.
   Boiler 4h
   Boiler 8h
   Public Light
   Heating
Location group-vector 57*b*, including e.g.
   Feeder 1
   Feeder 2
   Main Road
   Minor Road
Contracts group-vector 57*c*, including e.g.
   Green Current
   Blue Current
   Red Current Respective exemplary distinctive appliances 10 have the corresponding characteristics-vectors 60*a-e* as illustrated in FIG. 9:

Characteristics vector 60*a*
   Appliance 10*a* (No. 1): Boiler 4h; Feeder 1; Green Current; Characteristics vector 60*b*
   Appliance 10*a* (No. 1): Boiler 4h; Feeder 1; Green Current;
   Appliance 10*b* (No. 2): Boiler 4h; Feeder 1;
Characteristics vector 60*c*
   Appliance 10*a* (No. 1): Boiler 4h; Feeder 1; Green Current;
   Appliance 10*b* (No. 2): Boiler 4h; Feeder 1;
   Appliance 10*c* (No. 3): Boiler 8h
Characteristics vector 60*d*
   Appliance 10*f* (No. 5): Public Light; Minor Road;
Characteristics vector 60*e*
   Appliance 10*e* (No. 4): Public Light; Main Road;
   Appliance 10*f* (No. 5): Public Light; Minor Road;

According to the definitions of the characteristics vectors 60 above, a load control command 30 with the respective command-group-vector would address respective appliances 10 as illustrated in FIG. 9. If the evaluation is successful, the respective load control command 30 is accepted and written to the priority table 49 (see FIG. 8). For example, the variable "process_value" may then contain the instruction value 32 of the running load control command 30 of the highest rank, i.e. the load control command 30 of highest priority level 52 in the priority table 49, which thereby becomes the effective load control command 30. The respective value of the variable "process_value" is sent to the load interface unit 23 upon every change regarding the effective load control value 30 which is thereby continuously updated.

Alternatively or additionally, an appliance name attribute "applicance_name" can be used in a method according to the present invention. The attribute "appliance name" can be embodied as a string stored in a Data object (see DLMS blue book class_id=1). It can be used to identify the appliance 10 by its purpose. Preferably, the attribute "appliance name" is used for finding on of the appliances 10 in the load control system 1 without knowledge and/or application of the respective characteristics vector 60 and/or appliance control arrangement 20.

To summarise, a method for controlling a state of operation of at least one electrical appliance 10 and/or load 11 with a load control device 2 according to the present invention may make use of the following parts, elements, attributes, variables and/or values:

"command(data)": Data interface for load control commands 30.
"characteristics_vector": Characteristics vector 60 of the appliance 10 and/or the load 11.
"process_value": Instruction value 32 of the load control command 30 with the highest command priority parameter 51.
"priority_table": The priority table 49 containing all "running" load control commands 30.
"priority_persistence": For example a Boolean variable to set the priority table 49 to a certain persistence.
"appliance_name" For example an octet string for identifying the appliance 10 and/or load 11.

Furthermore, the attribute "process_value" can be handled such that it is persistent during power outage or other system critical events. In order to achieve that, the priority table 49 can be made persistent over the time of a power outage. After a power outage, the priority table 49 is re-installed and executed without any change in the remaining time values 54 of the state machines 55a-d. The priority table 49 can also be read out from the command processing unit 22 via the respective energy and/or information transmission line 4 for analysis, e.g. by the remote command centre 3.

Figure 10:
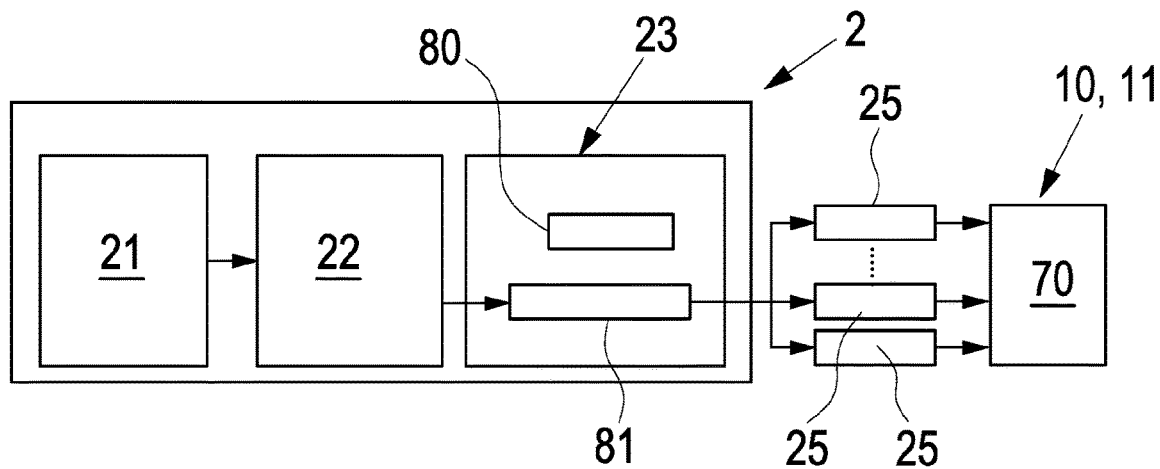
FIG. 10 shows a schematic diagram illustrating a load interface unit of a load control device according to an embodiment of the present invention.

FIG. 10 shows a schematic diagram illustrating the load interface unit 23 of the load control device 2. The load interface unit 23 provides a defined interface between the command processing unit 22 and the output modules 25, e.g. digital outputs. The input to the load interface unit 23 from the command processing unit 22 can be an unsigned integer value through the respective instruction value 32 which is to be mapped to state or operation of the output module 25.

The output modules 25 may be combined in any number and form required. Each of the output modules 25 or a group thereof is connected to a physical output element 70, i.e. a specific physical output device, such as a relay or alike, associated to and/or part of the appliance 10 and/or load 20 to be controlled. Several of the output 25 can be grouped together to enable more output states than a single on-off state. Such configurations are for example advantageous for appliances 10 running under the German Law for Renewable Energies (Erneuerbare Energien Gesetz—EEG), according to which e.g. four output modules 25 can be used to level the production of PV installations as appliances 10. Also, analogue signals/data or simple predefined serial data can be sent to the appliances 10 via a plurality of output modules 25.

Preferably, the appliance 10 and/or load 11 on the physical side of the output is defined during installation of the appliance 10 and/or load 11. A load type element 80 identifies the managed appliance 10 and/or load 11. For each appliance 10 and/or load 11, a load interface unit 23 is required. One load interface unit 23 can manage one or more output modules. In an exemplary generic embodiment of a load interface unit 23 several output modules 25 are served by a single load interface unit 23. Such a configuration can be used for all load control devices 2 with output modules. Alternatively or additionally, the load interface unit 23 can implement auxiliary control elements 47, such as other DLMS objects, for analogue use cases.

The load type element 80 may be implemented as a simple octet string stored in a Data object (see e.g. DLMS blue book class_id=1) and identifies the managed appliance 10 and/or load 11. Preferably, similar appliances 10 and/or loads 11 are controlled by means of the same load interface unit 23. Possible examples of a load type elements 80 are:

| |
|---|
| Boiler 4 h |
| Boiler 2 h |
| EEG 10 kW |

The load type elements 80 can be used to constitute or at least form a part of the characteristics vectors 60 (see FIG. 9). Thereby, the load type element 80 can be used to identify the managed appliance 10 and/or load 101 and/or a configuration of the load interface unit 23 which may be particularly helpful when used in conjunction with predefined configurations during installation. In general, the load interface unit 23 is only altered during installation, replacements or other changes. The output modules 25 may be defined according to an interface class associated to the respective physical output element 70 acting as physical output (e.g. hardware apparatus). Such an interface class may constitute a new DLMS class designed to switch mono-stable and bi-stable relays or digital IOs or alike, used as physical output elements 70.

Exemplary functionalities of the physical output elements 80 include:
- Invert output signal: Used if an inverting air gap switch is connected to the output module 25.
- Automatic confirmation functionality: Retriggering of current state is used against magnetic or mechanical fraud attempt.
- Logging of state changes.

Furthermore, an interface script table element 81 (see e.g. DLMS blue book class_id=9) can be used to implement specific behaviours on the output modules 25. For example, a script for group events, such as e.g. first switching off all output modules 25 and then switching on a single specific one of the output modules 25 can be implemented by means of the script table element 81. Deviations between an operational state of the output module 25 and the physical output element 70 can be monitored by means of specific DLMS objects, e.g. as being used for relay monitoring applications.

FIG. 11 shows a schematic diagram illustrating an exemplary sequence 90 of load control commands 30 handled by the load control device 2. In the present example, the sequence 90 is used to control the appliances 10 in the form of a streetlight application comprising a number of light bulbs, in particular two light bulbs, as the respective loads 11 per appliance 10. In the example illustrated in FIG. 11, each of the appliances 10 can be dimmed by switching off one of the two bulbs inside the lamp. Hence, in a first state of operation A of the appliance 10, both of the in the present exemplary case two loads 11, i.e. light bulbs. are switched on. In a first state of operation A of the appliance 10, both loads 11, i.e. light bulbs. are switched on. In a second state of operation B of the appliance 10, one of the two loads 11 is switched on, while the other one is switched off. In a third state of operation C of the appliance 10, both loads 11 are switched off.

Corresponding load control commands 30a-d our stacked above each other as the stick 50 in the order of their respective command priority parameter 51 on respective priority levels 52 administered in the priority table 49 administered by the command processing unit 22. The load control commands 30a-d are additionally identified by a respective command source 91. The load control command 30a is the currently effective load control command 30 because it is the active load control command 30 with the highest command priority parameter 51. The command source 91 of the load control command 30 a is the activity calendar element 43.

The first load control command 30a has the command priority parameter 51 set to the value of "2" and is configured to effect changes between the first state of operation A and the second state of operation B. Therefore, the load control command 30a contains a first instruction 31a, and a second instruction 31b. The first instruction 30a contains the respective instruction value 32, the duration values 33, 34, the delay values 35, 36, and the iteration value 37. In the present example, the instruction value 32 is pre-defined to evoke the second state of operation B, while the fixed duration value 33 is e.g. set to a value of 14.400 seconds corresponding to four hours, while the random duration value 34 is zero, the fixed start delay value 35 is set to a value of zero, the random start delay value 36 is set to a value of zero, and the iteration value 37 is set to a value of "1".

The second instruction 31b differs from the first instruction 31a, in that the instruction value 32 of the second instruction 31b is void, i.e. no action will be taken, while the fixed duration value 33 of the second instruction 31b is 72.000 seconds, i.e. 20 hours, complementing the fixed duration value 33 of the first instruction value 31a to an overall duration of both instructions 31a, 31b of 86.400 seconds, i.e. 24 h or one day. The random duration value 34, the fixed start delay value 35, and the random start delay value 36 of the second instruction 31b are zero, while the iteration value 37 is also set to a value of "1". Thus, the second instruction 31b has the effect, that the appliance 10 will simply not assume the second state of operation B, i.e. the appliance 10 will have either the first state of operation A or the third state of operation C, which in the present example means that the streetlights are not dimmed, but either fully on or shut off.

The second load control command 30b originates from the calendar means 42, e.g. an astronomical clock, has the command priority parameter 51 set to the value of "2" and is configured to effect changes between the first state of operation A and a third state of operation C, and thus complements the first load control command 30a. Therefore, the second load control command 30b contains a third instruction 31c, a fourth instruction 31d, and a fifth instruction 31e. The third instruction 31c has the instruction value 32 set to a value of "2" and is thus configured to evoke the first state of operation A, i.e. turning the streetlights fully on. The fixed duration value 33 of the third instruction 31c is set to a value of 86.400 seconds, i.e. 24 h or one day, while referring to a night time event in the calendar means 42. Consequently, the third instruction 31c comes into effect during night time, when the appliance 10 is supposed to be running, i.e. the streetlights are supposed to be shining.

The fourth instruction 31d of the second load control command 30b has the instruction value 32 set to set to a value of "0" and is thus configured to evoke the third state of operation C, i.e. turning the streetlights fully off. The fixed duration value 33 of the fourth instruction 31d is also set to a value of 86.400 seconds, i.e. 24 h or one day, while referring to a daytime event in the calendar means 42. Consequently, the third instruction 31c comes into effect during daytime, when the appliance 10 is supposed to not running, i.e. the streetlights are supposed to be not shining.

Similar to the third instruction 31c, the fifth instruction 31e has the instruction value 32 set to "2" and is thus configured to evoke the first state of operation A, i.e. turning the streetlights fully on. The fixed duration value 33 of the third instruction 31c is set to a value of 86.400 seconds, i.e. 24 h or one day, while referring to the night time event in the calendar means 42. Consequently, the fifth instruction 31c comes into effect during night time, when the appliance 10 is supposed to be running, i.e. the streetlights are supposed to be shining. Alternatively, the third to fifth instruction 31c, 31d, 31e may also be provided in that a load control command 30 is generated for each one of the instructions 31c, 31d, 31e. In other words, multiple instructions 31 for a specific appliance 10 and/or load 11 may be either provided by formulating a respective load control command 30 for each of the instructions 31c, 31d, 31e or by a single load control command 30 containing multiple instructions 31c, 31d, 31e.

The third load control command 30c originates from local triggering means 41, e.g. light sensor, has the command priority parameter 51 set to the value of "1" and is configured to effect changes between the first state of operation A and a third state of operation C, and thus competes with the second load control command 30b. Therefore, the third load control command 30c contains a sixth instruction 31f, and a seventh instruction 31g. The sixth instruction 31f has the instruction value 32 set to the value of "0" and is thus configured to evoke the third state of operation C, i.e. turning the streetlights fully off. The fixed duration value 33 of the sixth instruction 31f is set to a value of 3.600 seconds, i.e. 1 h. Consequently, the sixth instruction 31c comes into effect during dusk, when the appliance 10 is supposed to be turned off depending on natural light conditions, i.e. the streetlights are supposed to be turned off when the natural light exceeds a certain threshold set in the local triggering means 41.

The seventh instruction 31g has the instruction value 32 set to "2" and is thus configured to evoke the first state of operation A, i.e. turning the streetlights fully on. The fixed duration value 33 of the sixth instruction 31f is 3.600 seconds, i.e. 1 h. Consequently, the seventh instruction 31c comes into effect during dawn, when the appliance 10 is supposed to be turned on depending on the natural light conditions, i.e. the streetlights are supposed to be turned on when the natural light falls below a certain threshold set in the local triggering means 41. The random duration values 34 and the delay values 35, 36 of both, the sixth instruction 36f and the seventh instruction 36g are set to a value of zero, while their iteration value 37 is set to a value of "1".

The fourth load control command 30d originates from remote command centre 3, has the command priority parameter 51 set to the value of "3" and is employed to force evocation of the third state of operation C, e.g. due to a special event demanding for shutting the application 10 completely off, like in the present example, turning the streetlights off during a public firework. Therefore, the fourth load control command 30d contains an eighth instruction 31h which has the instruction value 32 set to the value of "0" and is thus configured to evoke the third state of operation C, i.e. turning the streetlights fully off. The fixed duration value 33 of the eighth instruction 31h is 3.600 seconds, i.e. 1 h. The random duration values 34 and the delay values 35, 36 of the eighth instruction 36h are set to a value of zero, and the iteration value 37 is set to a value of "1".

By the stack 50 of load control commands 30a-d shown in FIG. 11 it is provided that at a first point of time T1, e.g. 0:00 h, the first load control command 30a has the highest priority level 52 and therefore evokes the second state of operation B, i.e. the streetlights are on, but dimmed during a period of the day, were according to the respective TOU, the streetlights do not have to be fully on. At a second point of time T2, e.g. 4 AM, the first load control command 30a may be still running, but based on the instruction value 32 of the second instruction 31b, the first load control command 30 is inactive, i.e. ineffective, and thus the currently running second load control command 30b having the lower priority level 52 as the first load control command 30a comes into effect, evoking the state of operation A, i.e. the streetlights are trying fully on basic on the astronomical event that it is still night time.

At a third point of time T3, e.g. around 6 AM, the third load control command 30c starts running and due to that the third load control command 30c has a higher priority level 52 than the second load control command 30b, while the first load control command 30a is still inactive, the third load control command 30c overrides the second load control command 30b for the duration of one hour. Thus, from the third point of time T3 on, the streetlights are turned off for one hour based on that the local triggering means 41 sensed that the natural light level is sufficient. After that period, the fourth instruction 31d is in effect based on the second load control command 30b again has the highest priority level 52 and thus continues with setting the streetlights off, now based on astronomical daytime.

At a fourth point of time T4, e.g. around 5 PM, the third load control command 30c again overrides the second load control command 30b for the duration of one hour. Thus, from the fourth point of time T4 on, the streetlights are turned on for one hour based on that the local triggering means 41 sensed that the natural light level is not sufficient. After that period, the fifth instruction 31d is in effect based on that the second load control command 30b again has the highest priority level 52 and thus continues with setting the streetlights on, now based on astronomical night time.

At a fifth point of time T5, e.g. around 10 PM, the fourth load control command 30c having the highest priority level 52 in the stack 50 starts running and immediately overrides the second load control command 30b for the duration of one hour. Thus, from the fifth point of time T5 on, the streetlights are turned off for one hour based on the special event implemented by the remote command centre 3. After that period, the fifth instruction 31d is again in effect based on that the second load control command 30b again has the highest priority level 52 and turns the streetlights on based on astronomical night time.

FIG. 12 shows a schematic diagram illustrating an exemplary embodiment of the load control device 2 carrying out the exemplary first load control command 30a at the first point of time T1. In the present example, at the first point of time T1, the activity calendar element 43 as the TOU targets the local script table element 44 of the local control unit 21 which will trigger an event at the first point of time T1 which activates an ID defined in the interface script table element 80. According to the activated ID, one of the two output modules 25a, 25b will operate the physical output element 70 connected thereto by the respective energy and/or information transmission line 4. Through operating the physical output element 70, e.g. a relay which is being opened, the appliance 10 is transferred to the state of operation B at the first point of time T1.

This dimming function representing a reduction of energy consumption by the appliance 10 through switching off one of its loads 11 is achieved in the present exemplary embodiment by means of the activity calendar element 43 in the form of a time of use (TOU) event at the first point of time T1, e.g. 0:00 AM, that effects several actions through objects in the appliance 10, the command processing unit 22 and the load interface unit 23. The corresponding load control command 30 can be configured in the form of a "Half Night Dimming Command" with all corresponding parameters and values set in parenthesis as follows:

"Command (1, 0, 0, [{1,0,14400}], 1, 0, [ ])",
wherein the parameters and values read from left to right are as follows:
  1: number to identify the load control command 30,
  0: random start delay value 35 (time window in seconds),
  0: fixed start delay value 36 (time in seconds),
  [{1,0,14400}], array of instructions 31 with one entry,
    1, instruction value 32 (corresponding to the state of operation B which means to switch off one of the two loads 10, e.g. the dim bulb),
    0, random duration value 34,
    14400, fixed duration value 33 (in seconds=4 h),
  1: iteration value 37, i.e. the instruction 31 will be iterated one time,
  2, command priority parameter 51
  [ ], group vector 57 ("command_group_vectors"),
    [ ]: command_group_vectors (empty, i.e. containing no groups).

In a next step, the local script table element 44 is a source and targets the command processing unit 22. Therefore, a respective in the local script table element 44 with the defined ID contains the above-specified "Half Night Dimming Command" is sent to the command processing unit 22.

In a further step, the command processing unit 22 acts as a source and targets the interface script table element 81. Therefore, the command processing unit 22 will parse the first load control command 30a. In view of that the group vector 57 of the first load control command 30a is empty, the first load control command 30a is verified and thus accepted. The start delay values 35, 36 are both set to the value of "0", so that no waiting time before instruction processing occurs. The instruction parameters "{1,0,14400}" and the respective instruction value 32 of "1" are set in the priority table 49 at priority level 52 of "2". Since this at the respective moment is the highest priority level 52, the process value will change its value to 1. This process value is forwarded to the interface script table element 81 in the load interface unit 23.

In a final step, the interface script table element 81 act as a source and targets one output modules 25a, 25b. The respective entry of the interface script table element 81 in the load interface unit 23 contains the action that will evoke the second state of operation B by setting 1 of the output modules 25a, 25b to the value of "0", e.g. by setting an attribute "state" of the object "Digital Output 2" corresponding to the output module 25a to the value of "0".

Figure 13:
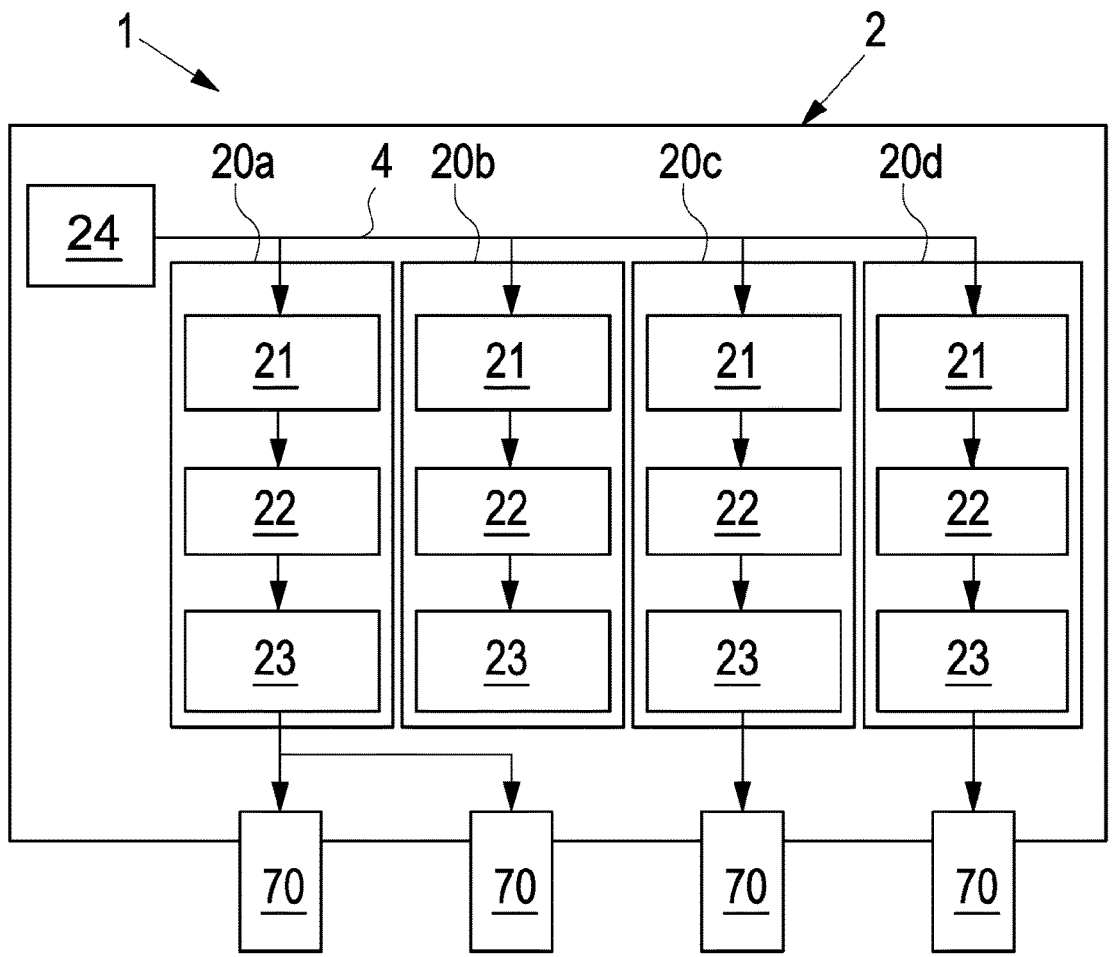
FIG. 13 shows a schematic diagram illustrating an exemplary embodiment of a load control device according to an embodiment of the present invention comprising a plurality of appliance control arrangements.

FIG. 13 shows a schematic diagram illustrating an exemplary embodiment of the load control device 2 comprising the plurality of appliance control arrangements 20a-d. For example, in a clearly defined LM/Grid system, a finite number of device configurations can be made with the well-defined local control unit 21, command processing unit 22, low interface unit 23, and respective characteristics vectors 60a-d for identifying the appliance control arrangements 20a-d and/or the respective appliances 10 and/or loads 11. At installation time one of these pre-defined and configured load control devices 2 can be installed and the managed appliances 10 and/or loads 11 have to be connected to the correct predefined physical output elements 70.

Alternatively or additionally it is possible to install the load control device 2 as being "empty", then connect all managed appliances 10 and/or loads 11 to the respective physical output element 70, i.e. a relay, and then record the respective properties and configurations, e.g. by writing them down a piece of paper. Later, it is possible to configure the whole load control device 2 according to the record.

Such installation methods are simple to use for the installing operator, but may not guarantee for a correct installation. Thus, a more certain way of installing the load control device 2 is with the help of a user interface 100, which may be provided as a local tool at the load control device 2, allowing to select predefined settings for every managed type of appliance 10 and/or load 11 in the load control system 1 (see FIG. 14).

In general, it is rather not intended to create new configurations during installation. A set of the load interface units 23 and the user interface 100 should be pre-defined. After connecting the managed appliances 10 and/or loads 11 to the load control device 2, the configuration should be carried out by assigning one of the load interface units 23 to each one of the managed appliances 10 and/or loads 11.

Additionally, but not mandatorily, 1 of the local control units 21 can be assigned to each one of the managed appliances 10 and/or loads 11.

Furthermore, the information for the characteristics vector 60 is part of the system management and normally not set during installation. A standard characteristics vector 60 may be configured if needed. As long as no characteristics vectors 60 are set, no remote load control command 30 can address the appliance control arrangements 2a-d. In addition, device serial numbers as well as addresses and/or names of operators of the load control device 2 can be recorded therein.

Figure 14:
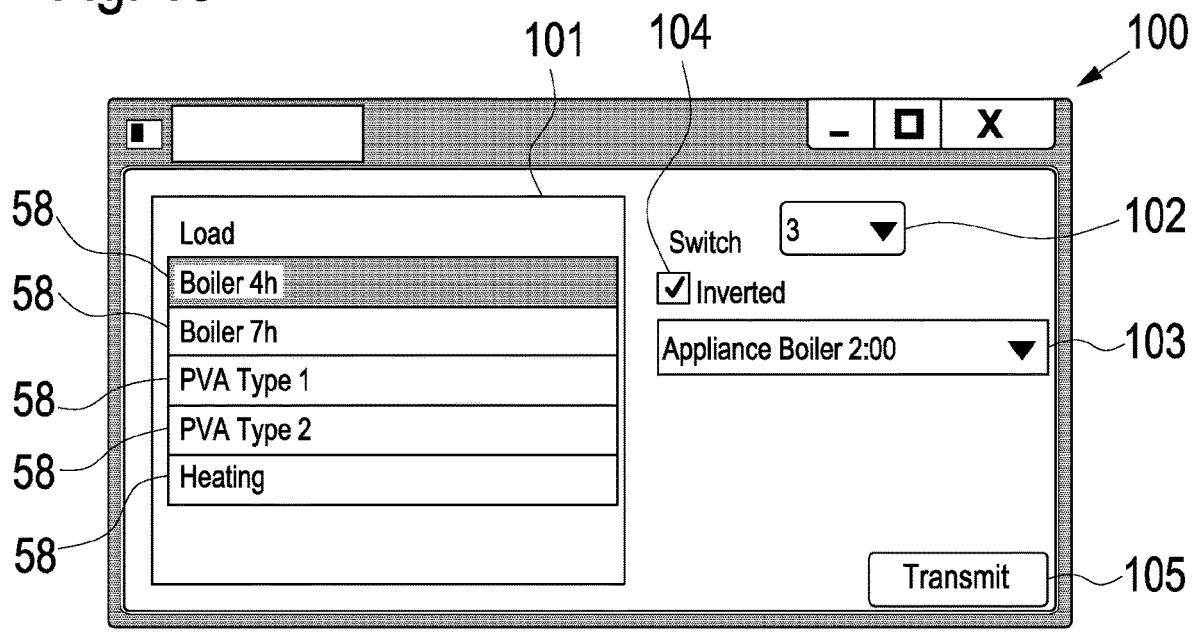
FIG. 14 shows a schematic exemplary illustration of a user interface of a local control unit of a load control device according to an embodiment of the present invention.

FIG. 14 shows a schematic exemplary illustration of the user interface 100 of the local control unit 21. The user interface 100 comprises a load selection field 101 for selecting the vector information 58 for identifying the corresponding appliance 10 and/or load 11, a output selection field 102 for selecting the respective output module 25 and/or physical output element 70, a load type field 103 for selecting the respective load type element 80, an inversion field 104 for selecting an inverted or non-inverted polarity during operation of the respective appliance 10 and/or load 11, and/or a submission element 105, such as a button, for transmitting the selections from the respective fields to the local control unit 21.

The user interface 100 enables an operator (not shown) to address an appliance 10 and/or load 11 to be controlled by selecting the corresponding vector information 58 from the load selection field 101. A particular appliance 10 and/or load 11 may then be chosen from the load type field 103. Thereby, a load control command 30 may be easily designated for the respective appliance 10 and/or load 11. Upon operation of the submission element 105, the load control command 30 is then sent to the selected appliance 10 and/or load 11. Consequently, the operator can easily address the appliances 10 and/or load 11 based on their respective vector information 58 in the load selection field 101 and/or the load type field 103 without the need of carrying out complex mapping operations in order to address appliances 10 and/or load 11 through the respective physical output element 70. According to the present invention, in view of the operator, the appliance 10 and/or load 11 to be controlled can be selected directly.

Deviations from the above-described embodiments are possible within the scope of the present invention.

The load control system 1 may comprise load control devices 2, remote command centres 3, and/or energy and/or information transmission lines 4 in any number and form required for implementing a desired load management configuration for controlling a state of operation A, B, C of any kind and number of appliances 10, and/or respective loads 11 by means of a computer program 6 which can be stored on a computer-readable data carrier 7, and is adapted to be sent, broadcasted, and/or received as a carrier signal 8 by any of the components of the load control system 1. Therefore, the load control device 2 and the remote command centre 3 may be provided with electronic data processing, storage, interface and/or operation means in any number and form desired. The energy and/or information emission lines 4 can be embodied as any kind of wired and/or wireless means for transferring energy, in particular electrical energy, and/or information, such as analogue and/or digital data, including any kind of computer software programs, interfaces, modules and/or functions, as well as communication systems, such as e.g. the Global System for Mobile Communications (GSM), DLMS/COSEM, Power-line communication (PLC), and alike.

The load control device 2 may comprise appliance control arrangements 20, local control units 21, command processing units 22, load interface units 23, common source modules 24, output modules 25, and/or command dispatching modules 26 in any number and form required for processing load control commands 30 which may contain instructions 31, with instruction value 32, duration values 33, 34, delay values 35, 36, iteration values 37, termination value 38, command start time value 39, and/or command start time value 40, in any number an form desired for implementing load management functions and corresponding events.

Accordingly, the load control device 2 may be further provided with local triggering means 41, calendar means 42, activity calendar elements 43, local script table elements 44, common script table elements 45, local control type element 46, auxiliary control elements 47, single action schedule elements 48, physical output elements 70, load type element 80, and/or interface script table elements 81, user interfaces 100, load selection field 101, output selection views 102, load type fields 103, inversion fields 104, and/or submission elements 105 in any number and form required for implementing load management functions and corresponding events. The priority table 49 and/or stack 50 can be configured as required for administering command priority parameters 51, priority levels 52, state machines 53, remaining time values 54, processing state variables 55, vector tables 56, group vectors 57, vector information 58, vector arrays 59, and/or characteristics vectors 60, in order to manage sequences 90 and/or command sources 91.

The functions performed by the elements, units and modules of the load control system 1 may be implemented as hardware and/or software in order to be carried out by a single entity and/or multiple entities within the load control device 2 and/or the remote command centre 3. The load control device 2 and/or the load command centre 3 may therefore comprise at least one computer, (micro)processor or other type of processor, and at least one computer-readable medium, such as the computer readable data carrier 7, which may be embodied as any kind of internal and/or external RAM and/or ROM memory device or data storage as well as corresponding permanent or non-permanent computer and/or machine-readable media, including but not limited to e.g. cloud storage devices, microchips, flash drives, EEPROM, magnetic disks, cards, tapes, and drums, punched cards and paper tapes, optical discs, barcodes, smart codes, and/or magnetic ink characters, that stores computer-readable program code (e.g., software or firmware), such as the computer program 6, executable by the (micro)processor, logic gates, switches, interfaces, gateways, transceivers, an application specific integrated circuit (ASIC), a programmable logic controller, and/or an embedded microcontroller, for example. In particular, the load control device 2 and/or the remote command centre 3 may be configured to perform any kind of processing, generation, determination, and/or control step as described herein.

REFERENCE SIGNS

| 1 | load control system | 46 | local control type element |
|---|---|---|---|
| 2 | load control device | 47 | auxiliary control element |
| 3 | remote command centre | 48 | single action schedule |

-continued

| | | | |
|---|---|---|---|
| 4 | energy and/or information transmission line | 49 | element priority table |
| 6 | computer program | 50 | stack |
| 7 | computer-readable data carrier | 51, 51a-d | command priority parameter |
| | | 52, 52a-d | priority level |
| 8 | data carrier signal | 53, 53a-d | state machine |
| 5 | receiving means | 54 | remaining time value |
| 10, 10a-f | appliance | 55, 55a-d | processing state variable |
| 11 | load | 56 | vector table |
| 20, 20a-d | appliance control arrangement | 57, 57a-c | group vector |
| | | 58, 58a-d | vector information |
| 21 | local control unit | 59 | vector array |
| 22 | command processing unit | 60, 60a-e | characteristics vector |
| 23 | load interface unit | 70 | physical output element |
| 24 | common source module | 80 | load type element |
| 25 | output module | 81 | interface script table element |
| 26 | command dispatching module | 90 | sequence |
| 30, 30a-d | load control command | 91 | command source |
| 31, 31a-h | instruction | 100 | user interface |
| 32 | instruction value | 101 | load selection field |
| 33 | fixed duration value | 102 | output selection field |
| 34 | random duration value | 103 | load type field |
| 35 | fixed start delay value | 104 | inversion field |
| 36 | random start delay value | 105 | submission element |
| 37 | iteration value | A | first state of operation |
| 38 | termination value | B | second state of operation |
| 39 | command start time value | C | third state of operation |
| 40 | command ending time value | T1 | first point of time |
| 41 | local triggering means | T2 | second point of time |
| 42 | calendar means | T3 | third point of time |
| 43 | activity calendar element | T4 | fourth point of time |
| 44 | local script table element | T5 | fifth point of time |
| 45 | common script table element | t | time |
| | | v | value |

The invention claimed is:

1. A load control device for controlling a state of operation of at least one electrical load, the load control device comprising:
at least one receiving means for receiving remote load control commands from at least one remote command centre; and/or
at least one local control unit for generating local load control commands at the load control device; and
at least one load interface unit for effecting load control operations influencing the state of operation of the at least one electric load, and
at least one command processing unit connected to the receiving means and/or to the at least one load interface unit, and configured to:
process a stack of the remote load control commands and/or the local load control commands for generating based thereon an effective load control command containing at least one instruction for the effecting of the load control operations, and
administrate a priority table listing the load control commands sorted according to a respective command priority parameter, wherein the priority table is attributed with a persistence value defining a persistence of the load control commands over a time of an electrical power outage, and wherein the at least one command processing unit is configured to reinstall and execute the priority table after the electrical power outage and to adjust a remaining time parameter depending on the persistence value.

2. The load control device according to claim 1, wherein the command processing unit is configured to generate a command sequence of effective load control commands.

3. The load control device according to claim 1, wherein the instruction includes an instruction value at least partly defining the state of operation of the load, and a time duration value defining a duration time of validity of the instruction value.

4. The load control device according to claim 1, wherein an individual priority level is assigned to each of the command priority parameters in the priority table.

5. The load control device according to claim 4, wherein each of the priority levels constitutes a state machine on its own.

6. The load control device according to claim 5, wherein processing states of the state machine comprise:
a start delay value representing a time span between start of a load control command and implementation of the at least one instruction, an iteration value for defining a number of iterations of implementing the instruction, and
a termination value for indicating termination of a load control command.

7. The load control device according to claim 1, wherein the at least one command processing unit is configured to address a load based on a characteristics-vector defining individual technical characteristics of the at least one electrical load.

8. The load control device according to claim 1, wherein a command group vector comprises a plurality of characteristics vectors.

9. The load control device according to claim 1, wherein the load control device comprises at least one appliance control arrangement configured to operate a plurality of loads associated to an appliance.

10. The load control device according to claim 9, wherein each appliance control arrangement is provided with at least one of the local control unit, the load interface unit, and the command processing unit.

11. The load control device according to claim 9, wherein the load control device comprises a common source module configured to define at least one event common to a plurality of the appliance control arrangements.

12. The load control device according to claim 9, wherein the load control device comprises a command dispatching module configured to dispatch received remote load control commands to the at least one appliance control arrangement.

13. A load control system comprising at least one load control device according to claim 1.

14. A method of controlling a state of operation of at least one electrical load with a load control device, comprising the steps of:
receiving, by at least one receiving means of the load control device, remote load control commands from at least one remote command centre; and/or
generating, by at least one local control unit of the load control device, local load control commands; and
processing, by at least one command processing unit of the load control device, a stack of the remote load control commands and/or the local load control commands; and
implementing, by at least one load interface unit of the load control device, an effective load control command containing at least one instruction for the effecting of load control operations based on the stack for effecting load control operations influencing the state of operation of the at least one electric load, based on the at least one instruction, and
administrating, by the at least one command processing unit, a priority table listing the load control commands sorted according to a respective command priority parameter, wherein the priority table is attributed with a persistence value defining a persistence of the load control commands over a time of an electrical power outage, and wherein the at least one command processing unit is configured to reinstall and execute the priority table after the electrical power outage and to adjust a remaining time parameter depending on the persistence value.

15. The method of claim 14, characterised by the further step of providing a series of process values based on the stack, which process values one after the other determine the state of operation of the at least one load.

16. A computer program comprising instructions which, when the program is executed by a computer, cause the computer to carry out the steps of the method of claim 14.

17. A computer-readable data carrier having stored thereon the computer program of claim 16.

18. A data carrier signal carrying the computer program of claim 16.

* * * * *